(12) United States Patent
Shartzer et al.

(10) Patent No.: US 11,649,804 B2
(45) Date of Patent: May 16, 2023

(54) SYSTEMS AND METHODS FOR CONTROLLING A WIND TURBINE

(71) Applicant: General Electric Renovables Espana, S.L., Barcelona (ES)

(72) Inventors: Samuel Bryan Shartzer, Greenville, SC (US); Scott Charles Evans, Burnt Hills, NY (US); Arunvenkataraman Subramanian, Dublin, CA (US); Dhiraj Arora, Rexford, NY (US); Samuel Davoust, Garching (DE)

(73) Assignee: General Electric Renovables Espana, S.L., Barcelona (ES)

( * ) Notice: Subject to any disclaimer, the term of this patent is extended or adjusted under 35 U.S.C. 154(b) by 144 days.

(21) Appl. No.: 17/340,387

(22) Filed: Jun. 7, 2021

(65) Prior Publication Data
US 2022/0389906 A1 Dec. 8, 2022

(51) Int. Cl.
*F03D 9/00* (2016.01)
*H02P 9/04* (2006.01)
(Continued)

(52) U.S. Cl.
CPC ............. *F03D 7/045* (2013.01); *F03D 7/046* (2013.01); *F03D 7/048* (2013.01); *F03D 9/257* (2017.02);
(Continued)

(58) Field of Classification Search
CPC .......... F03D 7/045; F03D 7/046; F03D 7/048; F03D 9/257; F03D 17/00; F05B 2270/32;
(Continued)

(56) References Cited

U.S. PATENT DOCUMENTS

| 6,320,272 B1 | 11/2001 | Lading et al. |
| 7,004,724 B2 | 2/2006 | Pierce et al. |

(Continued)

FOREIGN PATENT DOCUMENTS

| CN | 108448610 A | 8/2018 |
| CN | 109492777 A | 3/2019 |

(Continued)

OTHER PUBLICATIONS

Evans et al., Towards Wind Farm Performance Optimization Through Empirical Models, 2014 IEEE Aerospace Conference, Big Sky, MT, 2014, pp. 1-12.

(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A system and method are provided for controlling a wind turbine of a wind farm. Accordingly, a controller implements a first model to determine a modeled performance parameter for the first wind turbine. The modeled performance parameter is based, at least in part, on an operation of a designated grouping of wind turbines of the plurality of wind turbines, which is exclusive of the first wind turbine. The controller then determines a performance parameter differential for the first wind turbine at multiple sampling intervals. The performance parameter differential is indicative of a difference between the modeled performance parameter and a monitored performance parameter for the first wind turbine. A second model is implemented to determine a predicted performance parameter of the first wind turbine at each of a plurality of setpoint combinations based, at least in part, on the performance parameter differential the first wind turbine. A setpoint combination is then selected based on the predicted performance parameter and an operating state of the (Continued)

first wind turbine is changed based on the setpoint combination.

20 Claims, 11 Drawing Sheets

(51) Int. Cl.
- *F03D 7/04* (2006.01)
- *F03D 17/00* (2016.01)
- *F03D 9/25* (2016.01)

(52) U.S. Cl.
CPC .......... *F03D 17/00* (2016.05); *F05B 2260/83* (2013.01); *F05B 2270/32* (2013.01); *F05B 2270/325* (2013.01); *F05B 2270/327* (2013.01); *F05B 2270/328* (2013.01); *F05B 2270/335* (2013.01); *F05B 2270/404* (2013.01); *F05B 2270/803* (2013.01)

(58) Field of Classification Search
CPC .......... F05B 2270/325; F05B 2270/327; F05B 2270/328; F05B 2270/404; F05B 2270/803
See application file for complete search history.

(56) References Cited

U.S. PATENT DOCUMENTS

| | | | |
|---|---|---|---|
| 7,118,339 B2 | 10/2006 | Moroz et al. | |
| 7,603,202 B2 | 10/2009 | Weitkamp | |
| 7,883,317 B2 | 2/2011 | Ormel et al. | |
| 7,987,067 B2 | 7/2011 | Harrison et al. | |
| 8,025,476 B2 | 9/2011 | Zheng et al. | |
| 8,057,174 B2 | 11/2011 | Scholte-Wassink | |
| 8,239,071 B2 | 8/2012 | Lausen | |
| 8,249,852 B2 | 8/2012 | Thulke | |
| 8,269,361 B2 | 9/2012 | Egedal | |
| 8,398,369 B2 | 3/2013 | Rebsdorf et al. | |
| 8,495,911 B2 | 7/2013 | Andersen et al. | |
| 8,587,140 B2 | 11/2013 | Egedal et al. | |
| 8,712,593 B2 | 4/2014 | Bjertrup et al. | |
| 8,853,877 B1 | 10/2014 | Zalar et al. | |
| 9,217,416 B2 | 12/2015 | Spruce et al. | |
| 9,261,076 B2 | 2/2016 | Abdallah et al. | |
| 9,466,032 B2 | 10/2016 | Dull et al. | |
| 9,551,322 B2 | 1/2017 | Ambekar et al. | |
| 9,605,558 B2 | 3/2017 | Perley et al. | |
| 9,606,518 B2 | 3/2017 | Evans et al. | |
| 9,644,612 B2 | 5/2017 | Evans et al. | |
| 9,683,552 B2 | 6/2017 | Tiwari et al. | |
| 9,739,262 B2 | 8/2017 | Wang et al. | |
| 9,777,706 B2 | 10/2017 | Couchman et al. | |
| 9,790,921 B2 | 10/2017 | Egedal et al. | |
| 9,822,764 B2 | 11/2017 | Esbensen et al. | |
| 9,991,771 B2 | 6/2018 | Zhu et al. | |
| 10,041,475 B1 | 8/2018 | Badrinath et al. | |
| 10,132,295 B2 | 11/2018 | Lund et al. | |
| 10,241,170 B2 | 3/2019 | Piron et al. | |
| 10,247,170 B2 | 4/2019 | Evans et al. | |
| 10,288,037 B2 | 5/2019 | Cosack et al. | |
| 10,360,500 B2 | 7/2019 | Kabul et al. | |
| 10,393,093 B2 | 8/2019 | Gregg et al. | |
| 10,487,804 B2 | 11/2019 | Evans et al. | |
| 10,594,712 B2 * | 3/2020 | Mestha .................. | G06N 3/084 |
| 10,605,228 B2 | 3/2020 | Evans et al. | |
| 10,666,076 B1 | 5/2020 | Kohn et al. | |
| 10,711,767 B2 | 7/2020 | Lutjen et al. | |
| 10,724,499 B2 | 7/2020 | Nayebi et al. | |
| 10,731,630 B2 | 8/2020 | Tiwari et al. | |
| 10,815,972 B2 | 10/2020 | Evans et al. | |
| 11,231,012 B1 * | 1/2022 | Shartzer .................. | F03D 17/00 |
| 11,396,825 B2 * | 7/2022 | Agarwal .......... | G06F 16/24578 |
| 2008/0086281 A1 | 4/2008 | Santos | |
| 2010/0014969 A1 | 1/2010 | Wilson et al. | |
| 2010/0092292 A1 | 4/2010 | Nies et al. | |
| 2010/0135789 A1 | 6/2010 | Zheng et al. | |
| 2010/0152905 A1 | 6/2010 | Kusiak | |
| 2011/0020122 A1 | 1/2011 | Parthasarathy et al. | |
| 2011/0049883 A1 | 3/2011 | Hatch et al. | |
| 2011/0106680 A1 | 5/2011 | Vittal et al. | |
| 2011/0145277 A1 | 6/2011 | Gadre et al. | |
| 2011/0175353 A1 | 7/2011 | Egedal et al. | |
| 2012/0083933 A1 | 4/2012 | Subbu et al. | |
| 2012/0226474 A1 | 9/2012 | Trejo Sanchez et al. | |
| 2013/0024179 A1 * | 1/2013 | Mazzaro .................. | F01D 17/20 703/18 |
| 2013/0073223 A1 | 3/2013 | Lapira et al. | |
| 2013/0106107 A1 | 5/2013 | Spruce et al. | |
| 2013/0184838 A1 | 7/2013 | Tchoryk et al. | |
| 2014/0100703 A1 | 4/2014 | Dull et al. | |
| 2014/0172329 A1 | 6/2014 | Zhang et al. | |
| 2014/0356161 A1 | 12/2014 | Creaby | |
| 2015/0050145 A1 | 2/2015 | Cosack et al. | |
| 2015/0086357 A1 | 3/2015 | Gregg | |
| 2015/0101401 A1 | 4/2015 | Ekanayake et al. | |
| 2015/0152847 A1 | 6/2015 | Guadayol Roig | |
| 2015/0214821 A1 | 7/2015 | Zhu et al. | |
| 2015/0233348 A1 | 8/2015 | Hiremath et al. | |
| 2015/0308416 A1 * | 10/2015 | Ambekar ................ | F03D 7/048 700/287 |
| 2016/0032893 A1 | 2/2016 | Herrig et al. | |
| 2016/0084224 A1 | 3/2016 | Tyber et al. | |
| 2016/0084233 A1 | 3/2016 | Evans et al. | |
| 2016/0169204 A1 | 6/2016 | Wang et al. | |
| 2016/0298607 A1 | 10/2016 | Gregg et al. | |
| 2016/0333854 A1 | 11/2016 | Lund et al. | |
| 2017/0122289 A1 | 5/2017 | Kristoffersen et al. | |
| 2017/0268487 A1 | 9/2017 | Yang et al. | |
| 2017/0328346 A1 | 11/2017 | Hales et al. | |
| 2017/0328348 A1 | 11/2017 | Wilson et al. | |
| 2017/0350369 A1 | 12/2017 | Evans et al. | |
| 2017/0370348 A1 * | 12/2017 | Wilson .................. | F03D 7/0224 |
| 2018/0003153 A1 | 1/2018 | Damgaard | |
| 2018/0030955 A1 | 2/2018 | Vaddi et al. | |
| 2018/0223807 A1 | 8/2018 | Badrinath Krishna et al. | |
| 2018/0307986 A1 | 10/2018 | Kabul et al. | |
| 2018/0364694 A1 | 12/2018 | Watanabe et al. | |
| 2019/0170119 A1 | 6/2019 | Nielsen | |
| 2019/0203693 A1 | 7/2019 | Tiwari et al. | |
| 2019/0278242 A1 | 9/2019 | Gervais | |
| 2019/0287026 A1 | 9/2019 | Calmon et al. | |
| 2019/0317741 A1 | 10/2019 | Herr et al. | |
| 2019/0317880 A1 | 10/2019 | Herr et al. | |
| 2019/0324430 A1 | 10/2019 | Herzog et al. | |
| 2020/0056589 A1 | 2/2020 | Evans et al. | |
| 2020/0064788 A1 | 2/2020 | Hentschel et al. | |
| 2020/0082043 A1 | 3/2020 | Chu et al. | |
| 2020/0192306 A1 | 6/2020 | Virani et al. | |
| 2020/0218232 A1 * | 7/2020 | Tallman .................. | F03D 7/046 |
| 2020/0271093 A1 | 8/2020 | Grunnet et al. | |
| 2020/0285738 A1 | 9/2020 | Tippenhauer et al. | |
| 2020/0291921 A1 | 9/2020 | Ou | |
| 2020/0291922 A1 | 9/2020 | Hovgaard et al. | |
| 2020/0300227 A1 | 9/2020 | Evans et al. | |
| 2020/0340450 A1 | 10/2020 | Grunnet et al. | |

FOREIGN PATENT DOCUMENTS

| | | |
|---|---|---|
| EP | 2048562 B1 | 8/2009 |
| EP | 2213873 A1 | 8/2010 |
| EP | 2477086 A1 | 7/2012 |
| EP | 2518308 A1 | 10/2012 |
| WO | WO2017/139046 A1 | 8/2017 |
| WO | WO2017/211367 A1 | 12/2017 |
| WO | WO2017/211368 A1 | 12/2017 |

(56) References Cited

FOREIGN PATENT DOCUMENTS

| WO | WO2018/121668 A1 | 7/2018 |
| WO | WO2018/198225 A1 | 11/2018 |

OTHER PUBLICATIONS

Evans et al., Wind Farm Performance Validation Through Machine Learning: Sector-wise Honest Brokers, 2015 IEEE Aerospace Conference, Big Sky, MT, 2015, pp. 1-8.

Leahy et al., Diagnosing Wind Turbine Faults Using Machine Learning Techniques Applied to Operational Data, 2016 IEEE International Conference on Prognostics and Health Management (ICPHM), Conference Ottawa, ON, Canada, Jun. 20, 2016-Jun. 22, 2016, pp. 1-8.

Marvuglia et al., Monitoring of Wind Farms' Power Curves Using Machine Learning techniques, Applied Energy, Oct. 2012, vol. 98, pp. 574-583.

Morshedizadeh et al., Power Production Prediction of Wind Turbines Using a Fusion of MLP and ANFIS Networks, IET Renewable Power Generation, vol. 12, Issue 9, Jul. 9, 2018, pp. 1025-1033.

Ouyang et al., Monitoring Wind Turbines' Unhealthy Status: A Data-Driven Approach, IEEE Transactions on Emerging Topics in Computational Intelligence, Miami, FL, 2018, pp. 1-10.

Rasmussen et al., Gaussin Processes for Machine Learning, Jun. 29, 2010. Abstract Only.

Toubakh et al., Advanced Pattern Recognition Approach for Fault Diagnosis of Wind Turbines, 2013 12th International Conference on Machine Learning and Applications, 2013 pp. 368-373.

Vaccaro et al., An Adaptive Framework Based on Multi-Model Data Fusion for One-day-Ahead Wind Power Forecasting, Electric Power Systems Research, vol. 81, Issue 3, Mar. 2011, pp. 775-782.

* cited by examiner

SYSTEMS AND METHODS FOR CONTROLLING A WIND TURBINE

FIELD

The present disclosure relates in general to wind turbines, and more particularly to systems and methods for controlling a wind turbine of a plurality of wind turbines of a wind farm via a plurality of models.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

Typically, a wind turbine will be equipped with a sensor system to monitor the environmental conditions affecting the wind turbine. This information may then be utilized to determine control setpoints for the wind turbine. However, certain limitations and/or inaccuracies in the data collected by the sensor system may result in the wind turbine being operated at sub-optimal setpoints relative to the true environmental conditions. For example, differences between a wind speed as measured by a sensor mounted on the wind turbine and the true wind speed may result in the rotor blades being set at pitch angle which varies from an optimal pitch angle for the true wind speed.

Additionally, performance optimization systems typically employed rely on static determinations of optimal setpoints based on a data collected over a testing period and would represent the best setting on average during that testing period. Accordingly, the setpoints may not be optimal for the environment conditions affecting the wind turbine at any particular instant of time.

In view of the aforementioned, the art is continuously seeking new and improved systems and methods for controlling a wind turbine of a wind farm.

BRIEF DESCRIPTION

Aspects and advantages of the invention will be set forth in part in the following description, or may be obvious from the description, or may be learned through practice of the invention.

In one aspect, the present disclosure is directed to a method for controlling a first wind turbine of a plurality of wind turbines of a wind farm. The method may include determining a modeled performance parameter for the first wind turbine via a first model implemented by a controller. The modeled performance parameter may be based, at least in part, on an operation of a designated grouping of wind turbines of the plurality of wind turbines. The designated grouping may be exclusive of the first wind turbine. Additionally, the method may include determining, via the controller, a performance parameter differential for the first wind turbine at multiple sampling intervals. The performance parameter differential may be indicative of a difference between the modeled performance parameter and a monitored performance parameter for the first wind turbine. The method may also include implementing a second model, via the controller, to determine a predicted performance parameter of the first wind turbine at each of a plurality of setpoint combinations based, at least in part, on the performance parameter differential of the first wind turbine. The controller may then be employed to select a setpoint combination of the plurality of setpoint combinations based on the predicted performance parameter. Additionally, the method may include changing an operating state of the first wind turbine based on the setpoint combination.

In an embodiment, determining the modeled performance parameter may include generating, via the controller, a correlation score for each of the plurality of wind turbines relative to the first wind turbine. Additionally, the forming of the designated grouping of wind turbines may be based, at least in part, on the correlation score for each of the plurality of wind turbines. A first training data set may be assembled which includes a plurality of operational environmental variables corresponding at least to the designated grouping of wind turbines monitored at a plurality of sampling intervals and across a plurality of design of experiments (DOE) states, wherein the plurality of setpoint combinations may be toggled. Additionally, the controller may be employed to generate a first regression model configured to predict the modeled performance parameter for the first wind turbine based on the operational environmental variables corresponding to the designated grouping of wind turbines. Furthermore, the controller may be employed to train the first regression model based on the first training data set.

In an additional embodiment, generating the correlation score may include determining, via the controller, a quantity of sampling intervals having indications of a power production in a nominal power producing state for both the first turbine and that each of the plurality of wind turbines. Additionally, the controller may determine a linear correlation between the modeled performance parameter and the performance of each of the plurality of wind turbines. Furthermore, a weighting function may be applied via the controller to the quantity of sampling intervals and the linear correlation so as to generate the correlation score.

In a further embodiment, assembling the first training data set may include establishing each wind turbine of the designated grouping in a first DOE state. A dwell interval may then be established wherein each wind turbine of the designated grouping is in the first DOE state at the initiation of the dwell interval. The method may also include transitioning each wind turbine of the designated grouping to a second DOE state at the conclusion of the dwell interval.

In yet a further embodiment, the environmental variables may include a DOE state wind speed encountered by each wind turbine designated grouping during each dwell interval. As such, assembling the first training data set may also include determining a first wind speed indication for each wind turbine of the designated grouping in the first DOE state. Each wind turbine of the designated grouping may be transitioned to a third DOE state from the second DOE state following the dwell interval of the second DOE state. A second wind speed indication for each wind turbine of the designated grouping may be determined in the third DOE state. Additionally, the method may include determining a second-DOE-state wind speed by combining the first wind speed indication in the second wind speed indication. The second-DOE-state wind speed may be indicative of the wind speed encountered by each wind turbine of the designated grouping during the dwell interval associated with the second DOE state. The determination of the second-DOE-state wind speed via the combination may preclude a recording of data indicative of the second-DOE-state wind speed while each wind turbine the designated grouping is in the second DOE state.

In an embodiment, assembling the first training data set at the plurality of sampling intervals may include modeling, via the controller, an estimated windspeed for each wind turbine of the designated grouping at each of the plurality of sampling intervals. Based, at least in part, on the estimated windspeed is model, the controller may determine a turbulence intensity for each wind turbine of the designated grouping at each of the plurality of sampling intervals.

In an additional embodiment, assembling the first training data set at the plurality of sampling intervals may include receiving, via the controller, data indicative of an atmospheric temperature affecting each wind turbine of the designated grouping at each of the plurality of sampling intervals. The controller may also determine a rolling average temperature for each wind turbine of the designated grouping, and a temperature deviation for each wind turbine of the designated grouping at each of the plurality of sampling intervals which corresponds to a difference between the data indicative of the atmospheric temperature and the a rolling average temperature each of the plurality of sampling intervals.

In a further embodiment, assembling the first training data set at the plurality of sampling intervals may include receiving, via the controller, data indicative of a generator-shaft acceleration for each wind turbine of the designated grouping each of the plurality of sampling intervals. The data indicative of the generator-shaft acceleration may be indicative of a portion of kinetic energy into or out of the rotor system.

In yet a further embodiment, assembling the first training data set at the plurality of sampling intervals may include filtering, via the controller, a plurality of data observations indicative of the plurality of operational variables of the first wind turbine and a plurality of environmental variables affecting the first wind turbine. Filtering the plurality of data observations may preclude an inclusion of data observations having a deviation greater than a standard deviation limit.

In an embodiment, assembling the first training data set at the plurality of sampling intervals may include filtering a power output observation corresponding to a power output for each wind turbine of the designated grouping so as to preclude an inclusion of at least one power output observation having a deviation greater than the standard deviation limit from a nominal power curve.

In an additional embodiment, following the training of the first regression model, the method may include determining, via the controller, a performance parameter prediction. The controller may then determine a statistical uncertainty value for the performance parameter prediction. Additionally, the controller may implement a Bayesian optimization of the first regression model based on the statistical uncertainty.

In a further embodiment, forming the designated grouping may also include minimizing an average delta performance uncertainty between differing DOE states for a plurality of potential designated groupings via a Bayesian optimization. Additionally, a maximal quantity of wind turbines of the designated grouping corresponding to the minimized delta performance uncertainty may be determined. Also, a minimal quantity of wind turbines of the designated grouping corresponding to the minimized delta performance uncertainty may be determined.

In yet a further embodiment, implementing the second model may include assembling a second training data set. The second training data set may include a plurality of operational environmental variables and the performance parameter differential for the first wind turbine. The plurality of operational environmental variables may correspond at least to the designated grouping of wind turbines monitored at a plurality of sampling intervals and DOE states and the first wind turbine. Additionally, the method may include generating, via the controller, a second regression model configured to determine the predictive performance parameter for the first wind turbine based on the operational environmental variables and the performance parameter differential. The controller may also utilize the second training data set to train the second regression model.

In an embodiment, assembling the second training data set may include determining, via the controller, a turbulence intensity for each wind turbine of the designated grouping and the first wind turbine at each of the plurality of sampling intervals based, at least in part, on an estimated windspeed as modeled or a measured wind speed.

In an additional embodiment, assembling the second training data set may include receiving, via the controller, data indicative of an atmospheric temperature affecting the first wind turbine and each of the plurality of sampling intervals. The controller may then determine a rolling average temperature for the first wind turbine. Additionally, the controller may determine a temperature deviation for the first wind turbine at each of the plurality of sampling intervals corresponding to a difference between the data indicative of the atmospheric temperature and the rolling average temperature at each of the plurality of sampling intervals.

In a further embodiment, assembling the second training data set may include determining, via the controller, at least one low-authority region of operation of the first wind turbine. The low-authority region(s) may correspond to a range of operating conditions within which a desired command setpoint is limited based on an operational limit of the first wind turbine and is desynchronized from an optimal rotor speed or pitch setting. Additionally, the controller may apply a weighting factor to the performance parameter differential when the operational environmental variables correspond to the low-authority region(s). The weighting factor may be configured to reduce an impact of the performance parameter differential on the predicted performance parameter.

In yet a further embodiment, training the second regression model may include separating a portion of the second training data set into a training portion having a first plurality of sampling intervals and a testing portion having a second plurality of sampling intervals. The training portion may include a greater quantity of sampling intervals relative to the testing portion. Additionally, the second regression model may be trained via the training portion. The second regression model may also be tested via the testing portion. Following the training and testing, the method may include reforming the training portion and the testing portion by redistributing the first and second pluralities of sampling intervals of the portion of the second training data set. Following the reformation, the method may include repeating the training and testing of the second regression model. Repeating the training and testing of the second regression model may facilitate a cross-validation test of the second regression model.

In an embodiment, the method may include implementing, via the controller, a Bayesian optimization to maximize the predictive performance parameter for the cross-validation test.

In an additional embodiment, the plurality of setpoint combinations may include a plurality of tested setpoint combinations corresponding to a plurality of DOE states. Determining the predicted performance parameter of the first wind turbine at each of the plot of setpoint combinations may thus include determining a predicted power output for each of the tested setpoint combinations and selecting a setpoint combination of the tested setpoint combinations which maximizes the predicted power output of the first wind turbine.

In a further embodiment, the plurality of tested setpoint combinations may include a plurality of pitch setpoints and a plurality of tip speed ratio (TSR) setpoints. The selected setpoint combination may include a pitch setpoint and a TSR setpoint which maximizes the predictive power output of the first wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
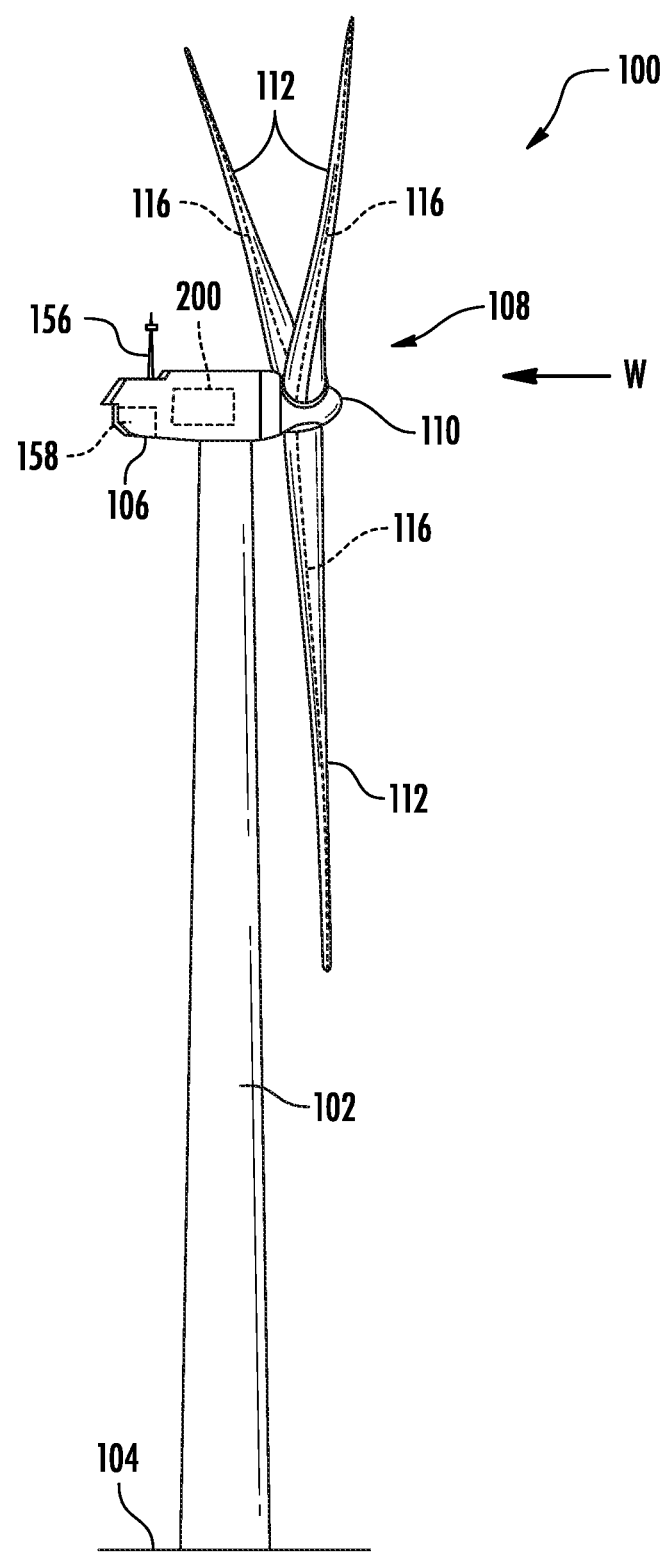
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine that may be part of a wind farm. In particular, the present disclosure may include systems and methods which facilitate the optimization of pitch and tip speed ratio (TSR) setpoints for a wind turbine using at least a pair of models. Accordingly, the systems and methods disclosed herein may determine key reference turbines (e.g., designated groupings) for which there exists an optimal correlation between the key reference turbines performance and the performance of a turbine of interest (e.g., a first wind turbine). The correlation may facilitate the prediction of the performance of the turbine of interest based off the performance of the key reference turbines by a first model. This predicted performance may be compared to a monitored performance of the turbine of interest to determine a difference between the performance predicted based on the performance of reference turbines and the monitored performance. The ability of the turbine of interest to perform in a predictable manner relative to the reference turbines may then be utilized in the generation, training and/or employment of a second model. In particular, the second model may be employed to determine a predicted performance parameter for the turbine of interest at a number of potential setpoint combinations. The results of this modeling may then be employed to select and implement an optimal setpoint for the wind turbine for the given environmental conditions impacting the wind farm.

In accordance with the present disclosure, the systems and methods described herein may include gathering field data at the farm level to train the machine learning models (e.g., the first and second models). The systems and methods may also include using the performance of a portion of the wind turbines of the wind farm to develop an objective baseline power model for the single turbine of interest (e.g., the first wind turbine). This first model may facilitate, at every measured field data observation, the determination of a performance parameter differential representing how the turbine of interest is underperforming or over performing relative to the key reference turbines. The performance parameter differential, estimated and captured at various environmental conditions, may be utilized to train and build a machine learning model (e.g., the second model, which may be considered a surrogate model). The second model may predict the performance of the turbine of interest at the various environmental conditions. Accordingly, second model may be employed to predict a performance improvement of the turbine of interest at all potential setpoint combinations. Based on these predictions, the setpoint combination which results in the most desirable performance (e.g., the highest estimated power production) may be selected and an operating state of the turbine of interest may be changed based on the selected setpoint combination. Additionally, a focused field toggle experiment may be executed to verify the achieving of the desired performance of the turbine of interest.

It should be appreciated that utilizing the performance of the key reference turbines to predict the power production of the turbine of interest may preclude a requirement that certain parameters the monitored at the turbine of interest. In other words, since the performance of the turbine of interest may be predicted based on the performance of the reference turbines, it may be unnecessary to monitor certain conditions affecting the turbine of interest. This may, in turn, reduce the sensor requirements, and therefore costs, for the wind farm. For example, the utilization of the performance of the reference turbines instead of directly monitored environmental conditions may eliminate a requirement for a meteorological mast, a lidar, or other sensor system disposed within the wind farm.

It should also be appreciated that the utilization of the performance differential as opposed to a direct measurement of the performance parameter may reduce the number of variables which must be accounted for by the control system. For example, calculations based on the power output of the turbine of interest may be subject to fluctuations in wind velocity. This may, thus, require the monitoring of wind velocity and make it more difficult to determine whether the power variations may be indicative of suboptimal pitch and TSR setpoints.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 3:
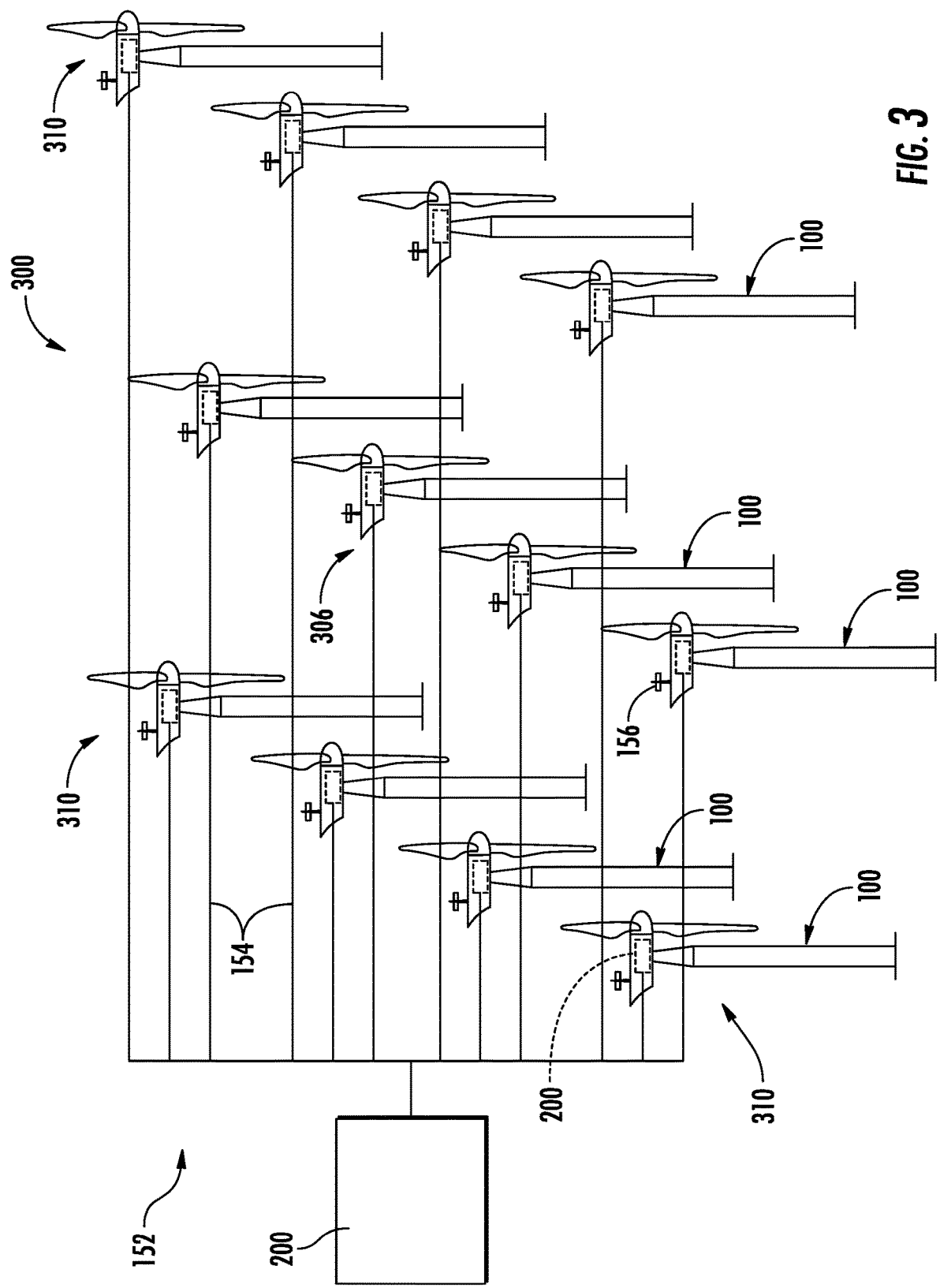
FIG. 3 illustrates a schematic diagram of one embodiment of a wind farm having a plurality of wind turbines according to the present disclosure.

The wind turbine 100 may also include a controller 200 configured as a turbine controller centralized within the nacelle 106. However, in other embodiments, the controller 200 may be located within any other component of the wind turbine 100 or at a location outside the wind turbine or the wind farm 152 (FIG. 3). For example, in an embodiment, the controller 200 may be a computing system configured to perform an offline analysis of the performance of the wind turbine 100. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as modeling, predicting, receiving, transmitting and/or executing wind turbine control signals (e.g., setpoints) and/or parameters.

Figure 2:
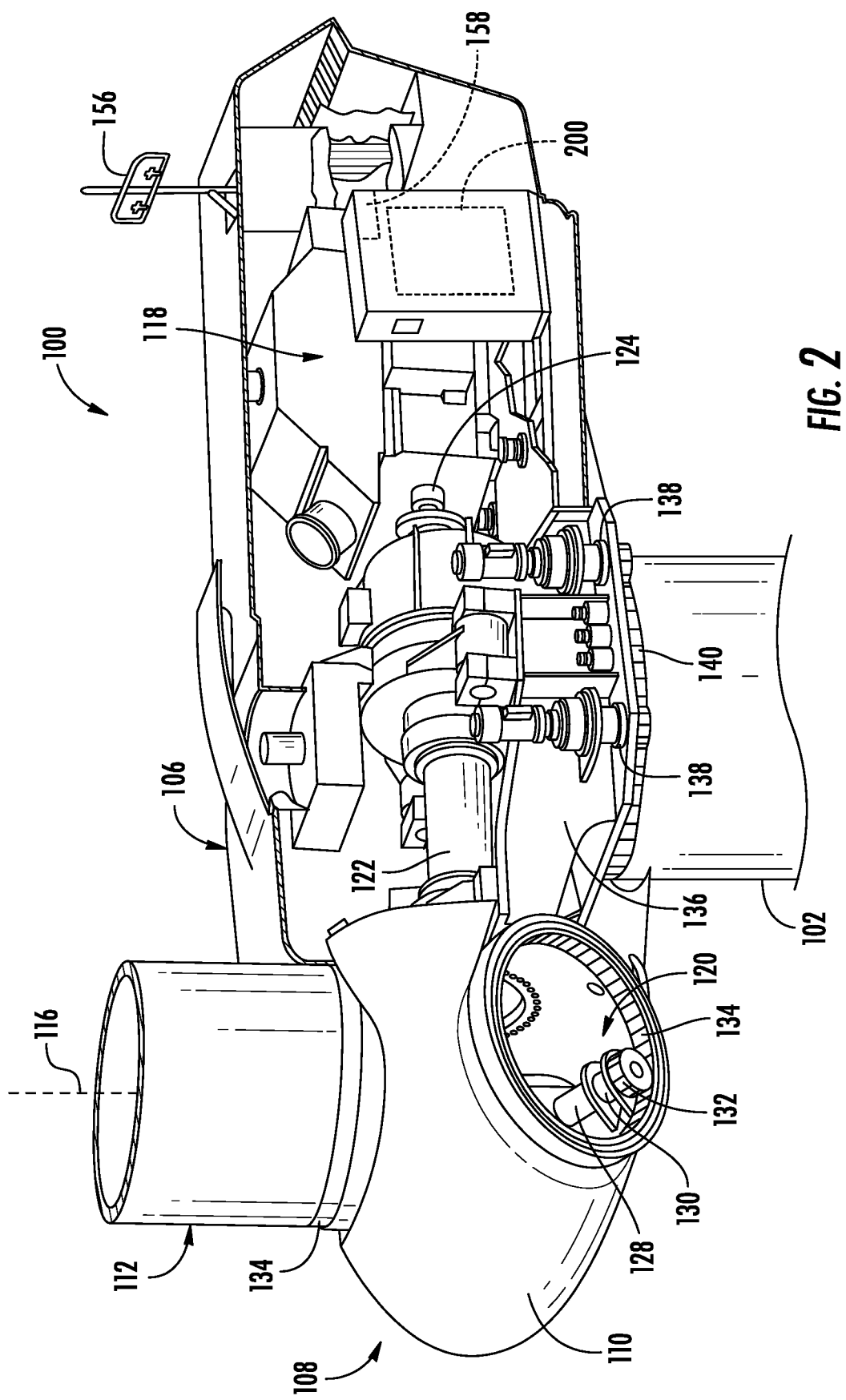
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller 200. Further, each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100). It should be appreciated that the controller 200 may direct the yawing of the nacelle 106 and/or the pitching of the rotor blades 112 so as to aerodynamically orient the wind turbine 100 relative to a wind (W) acting on the wind turbine 100, thereby facilitating power production.

Figure 4:
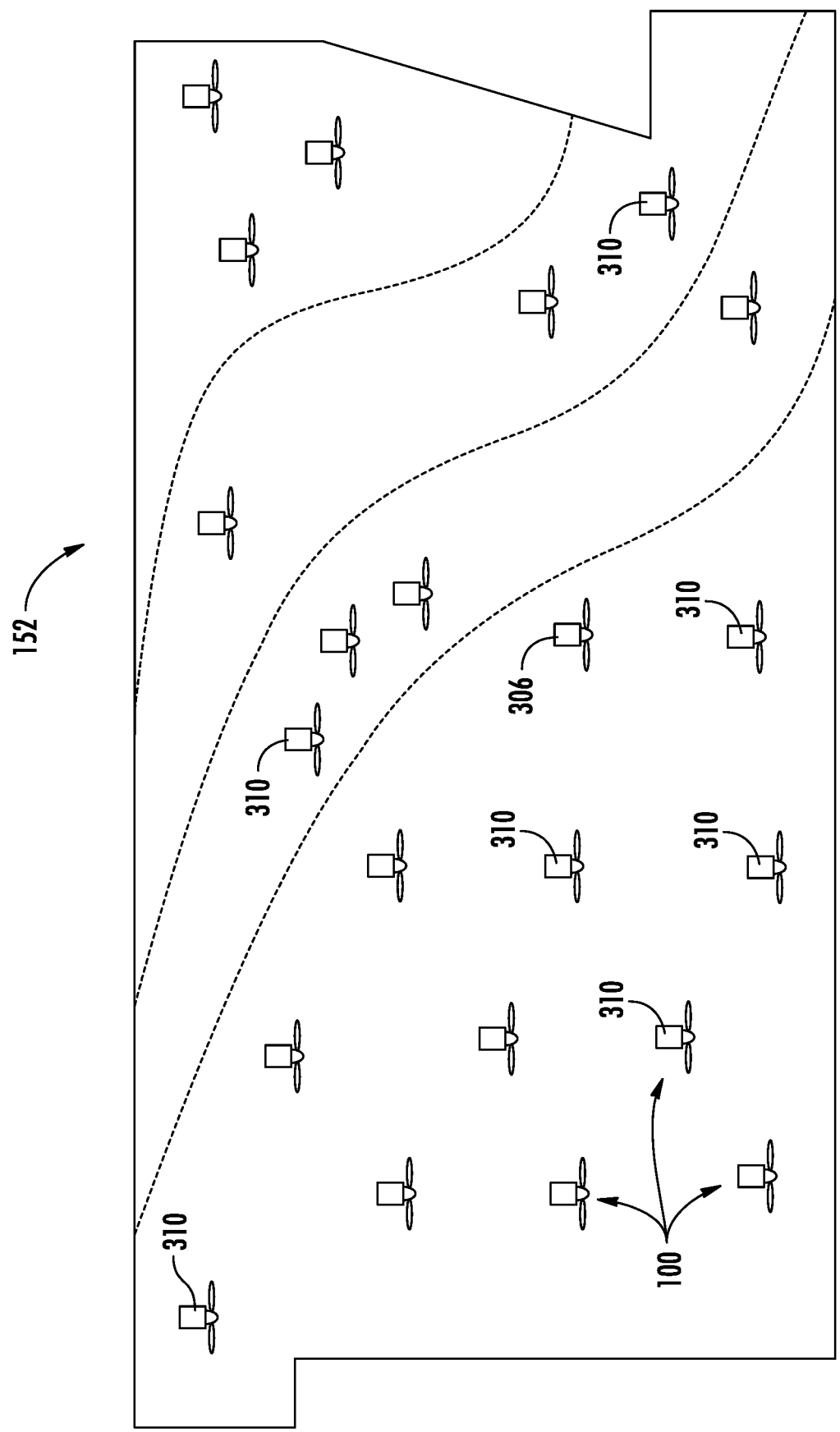
FIG. 4 illustrates an overhead view of a portion of the wind farm of FIG. 3 according to the present disclosure.
Figure 5:
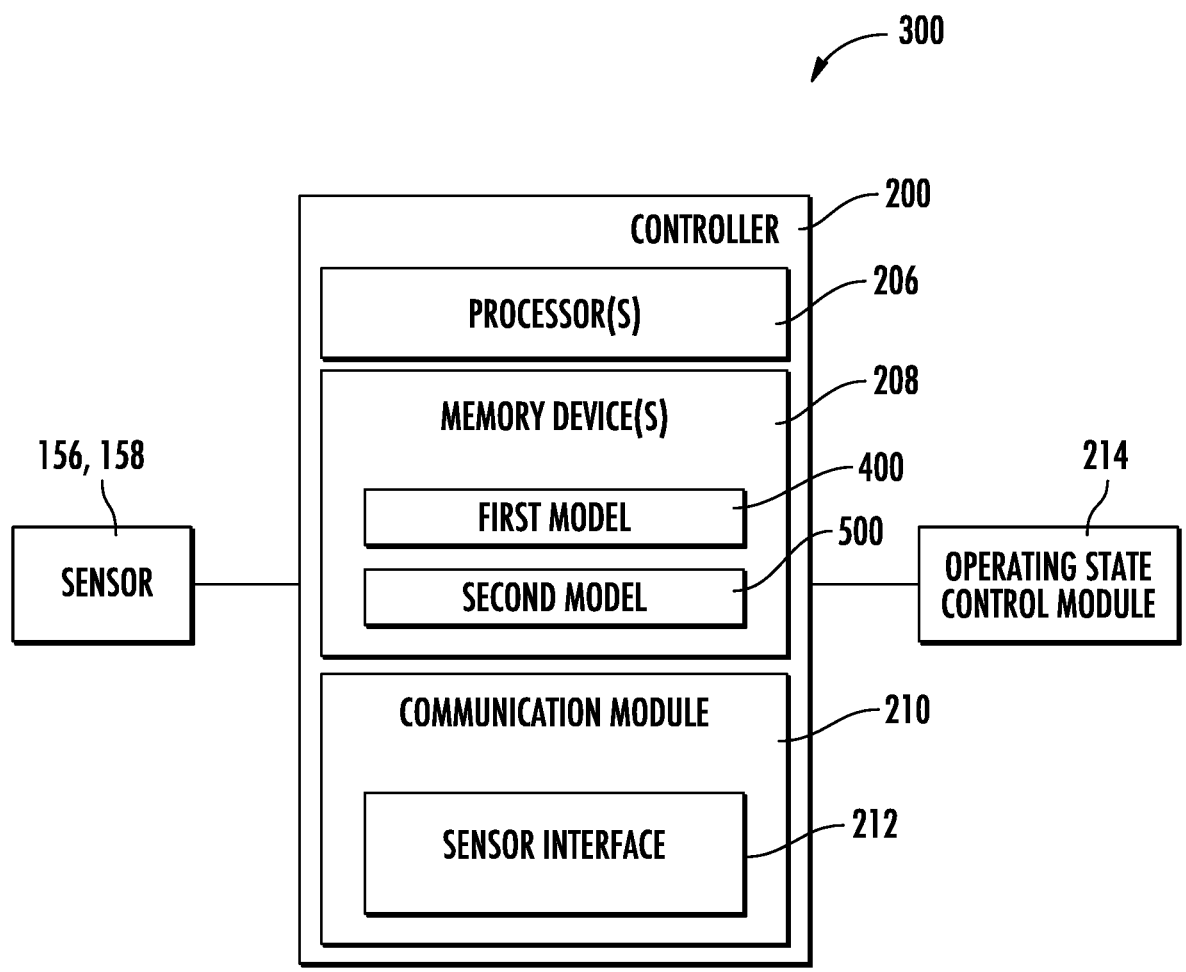
FIG. 5 illustrates a schematic diagram of one embodiment of a controller according to the present disclosure.

Referring now to FIGS. 3 and 4, a schematic view and a top view of a wind farm 152 according to the present disclosure are illustrated. As shown, the wind farm 152 may include a plurality of the wind turbines 100 described herein and the controller 200 configured as a farm controller. For example, as shown in the illustrated embodiment of FIG. 3, the wind farm 152 may include twenty-two wind turbines 100. However, in other embodiments, the wind farm 152 may include any other number of wind turbines 100, such as less than twelve wind turbines 100 or greater than twelve wind turbines 100. In one embodiment, the controller(s) 200 may be communicatively coupled via a wired connection, such as by connecting the controller(s) through suitable communicative links 154 (e.g., a suitable cable). Alternatively, the controller(s) may be communicatively coupled through a wireless connection, such as by using any suitable wireless communications protocol known in the art.

In several embodiments, the wind farm 152 may include a plurality of environmental sensors 156 for monitoring a wind profile of the wind (W) affecting the wind farm 152, and thereby the wind turbines 100. The environmental sensor 156 may be configured for gathering data indicative of at least one environmental condition. The environmental sensor 156 may be operably coupled to the controller 200. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind direction, wind speed, wind shear, wind gust, wind veer, atmospheric pressure, pressure gradient and/or temperature. In at least one embodiment, the environmental sensor(s) 156 may be mounted to the nacelle 106 at a location downwind of the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions at each wind turbine 100 to be monitored individually by the respective turbine controllers and collectively by the farm controller. However, it should be appreciated that the utilization of the systems and methods disclosed herein may preclude a requirement for the environmental sensor(s) 156 to monitor certain environmental conditions, such as wind speed, in order to determine a performance parameter the wind turbine(s) 100.

In an embodiment, the wind turbine(s) 100 may include at least one operational sensor 158 configured to monitor an operation of the wind turbine(s) 100. As such, the operational sensor(s) 158 may be configured to monitor multiple parameters associated with the performance and/or health of at least a component of the wind turbine(s) 100. For example, the operational sensor(s) 158 may monitor parameters associated with vibrations, audible signals, visual indications, angular positions, rotational velocities, bending moments, power consumption, power generation, temperature and/or other suitable parameters. The operational sensor(s) 158 may, for example, be a rotational speed sensor operably coupled to the controller 200. For example, the operational sensor(s) 158 may be directed at the rotor shaft 122 of the wind turbine(s) 100, such as the wind turbine 114. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a direct current (DC) tachometer, an alternating current (AC) tachometer, a digital tachometer, a contact tachometer a non-contact tachometer, or a time and frequency tachometer.

The operational sensor(s) 158 may, for example, be configured to collect data indicative of a response of the component(s) of the wind turbine(s) 100 to the environmental condition(s) or other load. For example, the operational sensor(s) 158 may be configured to monitor electrical parameters of the output of the wind turbine(s) 100. As such, the operational sensor(s) 158 may be a current sensor, voltage sensor, temperature sensors, power sensor, and/or frequency meter that monitors the electrical output of the wind turbine(s) 100.

It should also be appreciated that, as used herein, the term "monitor" and variations thereof indicates that the various sensors of the wind turbine(s) 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine(s) 100.

Referring now to FIGS. 3-11, wherein various aspects of multiple embodiments of a system 300 for controlling the wind turbine 100 according to the present disclosure are presented. As shown particularly in FIG. 5, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the wind turbines 100, and components thereof. Further, the communications module 210 may include a sensor interface 212 (e.g., one or more analog-to-digital converters) to permit signals transmitted from one or more sensors, such as the environmental sensor(s) 156 to be converted into signals that can be understood and processed by the processors 206. It should be appreciated that the sensors may be communicatively coupled to the communications module 210 using any suitable means. For example, as shown in FIG. 4, the sensors may be coupled to the sensor interface 212 via a wired connection. However, in other embodiments, the sensors may be coupled to the sensor interface 212 via a wireless connection, such as by using any suitable wireless communications protocol known in the art. Additionally, the communications module 210 may also be operably coupled to an operating state control module 214 configured to change at least one wind turbine operating state. It should be appreciated that in an embodiment, the controller 200 may be communicatively coupled to additional controllers 200, such as a controller 200 configured to perform an off-line analysis of the environmental and operational parameters of the wind turbines 100 of the wind farm 152.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, controlling the wind turbine 100 of the plurality of wind turbines 100 of the wind farm 152 as described herein, as well as various other suitable computer-implemented functions.

Figure 6:
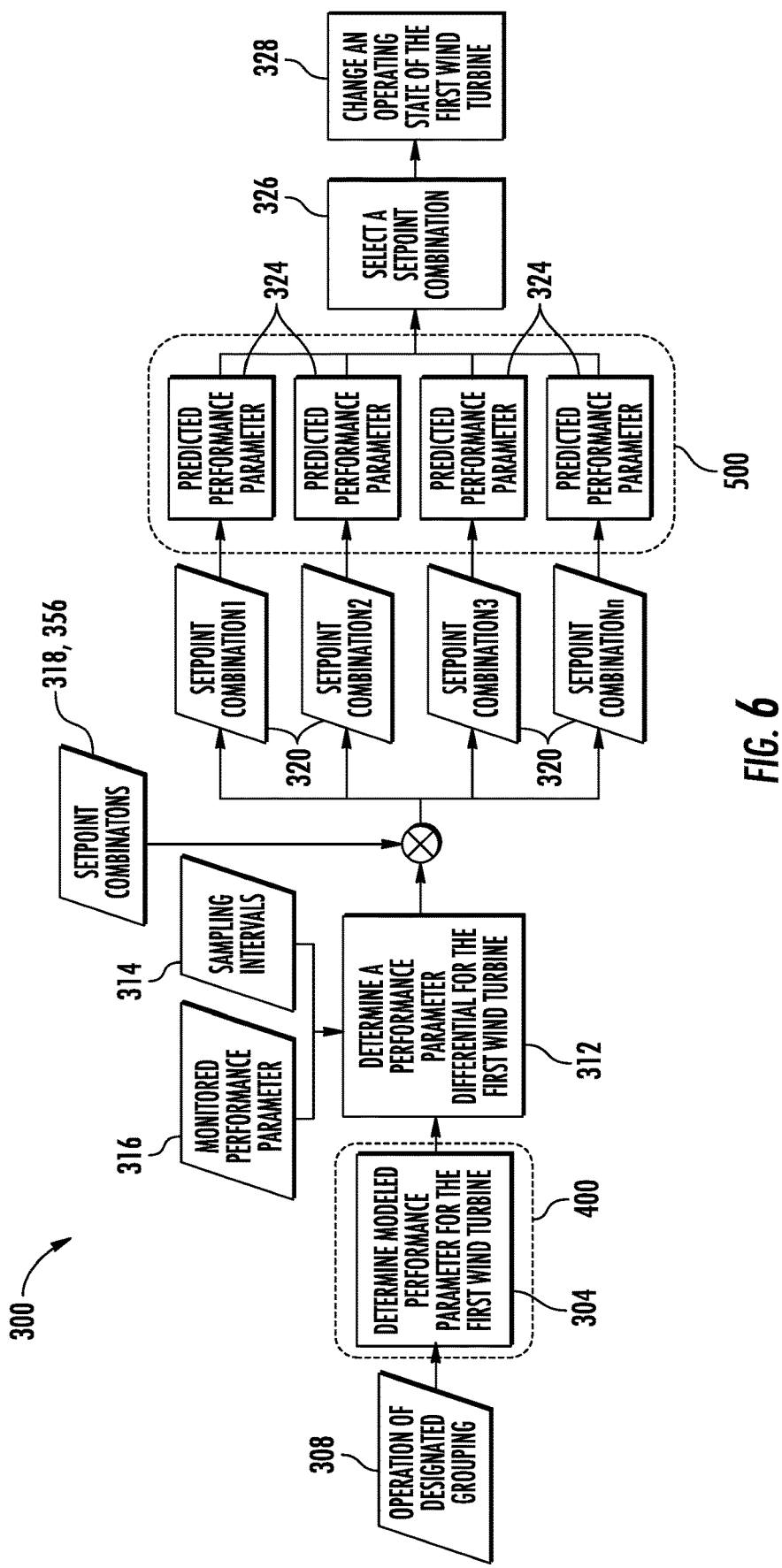
FIG. 6 illustrates a schematic diagram of one embodiment of a control logic of a system for operating a wind turbine according to the present disclosure.

Referring particularly to FIG. 6, in an embodiment, the controller 200 of the system 300 may be configured to implement a first model 400. The first model 400, which may be considered to be a power ensemble model, may be configured to determine a modeled performance parameter 304 for a first wind turbine 306 (e.g., a turbine of interest). The modeled performance parameter 304 may be based, at least in part, on an operation 308 of a designated grouping 310 of wind turbines 100 of the plurality of wind turbines of the wind farm 152. The designated grouping 310 may be exclusive of the first wind turbine 306. In other words, by employing the first model 400, the controller 200 may utilize the performance of a select portion of the wind turbines 100 (e.g., the key reference turbines of the designated grouping 310) not including the first wind turbine 306 to determine what the performance parameter 304 for the first wind turbine 306 should be for the environmental conditions affecting the wind farm 152.

By way of illustration, in an embodiment, the modeled performance parameter 304 may correspond to a power output of the first wind turbine 306. As such, the power output of each wind turbine 100 of the designated grouping 310 and the environmental conditions affecting the designated grouping 310 may be received by the controller 200. The controller 200 may then utilize the first model 400 to determine the expected/modeled performance parameter 304 based on the power outputs of the wind turbines 100 of the designated grouping 310 in response to the environmental conditions.

In an embodiment, the controller 200 may determine a performance parameter differential 312 for the first wind turbine 306. The performance parameter differential 312 may be determined at multiple sampling intervals 314. The performance parameter differential 312 may be indicative of a difference between the modeled performance parameter 304 and a monitored performance parameter 316 for the first wind turbine. In an embodiment, the monitored performance parameter 316 may be less than the modeled performance parameter 304. In such an embodiment, the performance parameter differential 312 may indicate that the actual performance of first wind turbine 306 may be less than predicted. For example, the performance parameter differential 312 may indicate that the monitored power output of the first wind turbine 306 may be less than the power output predicted by the first model 400 based on the performance of the designated grouping 310. It should be appreciated that in an additional embodiment, the performance parameter differential 312 may indicate that the performance of the first wind turbine 306 exceeds a predicted value.

Referring still to FIG. 6 in particular, in an embodiment, the controller 200 may be configured to receive and/or generate a plurality of setpoint combinations 318. The individual setpoint combinations 320 of the plurality of setpoint combinations 318 may include distinct combinations of potential setpoints for the various components of the first wind turbine 306. For example, each of the setpoint combinations 320 (e.g., setpoint combination$_1$ through setpoint combination$_n$) may reflect a different combination of setpoint values for pitch and/or TSR for the first wind turbine 306.

In an embodiment, the controller 200 may be configured to implement a second model 500. Accordingly, the controller 200 may, via the second model 500, determine a predicted performance parameter 324 of the first wind turbine 306 at each setpoint combinations 320 of the plurality of setpoint combinations 318. The predicted performance parameter 324 may be based, at least in part, on the performance parameter differential 312 for the first wind turbine 306. In other words, the second model 500 may simulate the performance of the first wind turbine 306 based, at least in part, on the difference between the performance predicted by the first model 400 and the monitored performance parameter 316. As such, the second model 500 may be employed to determine the predictive effects of the potential setpoint combinations 320 prior to changing an operating state of the first wind turbine 306.

As depicted at 326, the controller 200 may select a setpoint combination 320 of the plurality of setpoint combinations 318 based on the predicted performance parameter 324. The selected setpoint combination 320 may be the setpoint combination 320 predicted by the second model 500 that may optimize the first wind turbine 306 to meet a particular operational objective.

For example, in an embodiment, the operational objective may correspond to obtaining a maximal power production from the first wind turbine 306 for the given environmental conditions. In such an embodiment, the controller 200 may select the setpoint combination 320 which results in the greatest power production as indicated by the predicted performance parameter 324. However, in an additional embodiment, the operational objective may reflect an operational condition of the wind turbine and/or a condition within the electrical grid which may result in it being desirable to generate less than a maximal power production. Accordingly, the controller 200 may select the setpoint combination 320 which results in a sub-maximal power production as indicated by the predictive forms parameter 324. It should be appreciated that the operational objective is not restricted to measures of power production and may include any other suitable operational objective, such as time-in-service, wear mitigation, reactive power generation, grid forming, and/or rotor-inertia management.

As depicted at 328, an operating state of the first wind turbine 306 may be changed based on the selected setpoint combination 320. For example, the pitch of the rotor blade(s) 112 and/or a generator torque may be modified in order to achieve an optimal pitch and/or TSR setpoint for the given environmental conditions.

Figure 7:
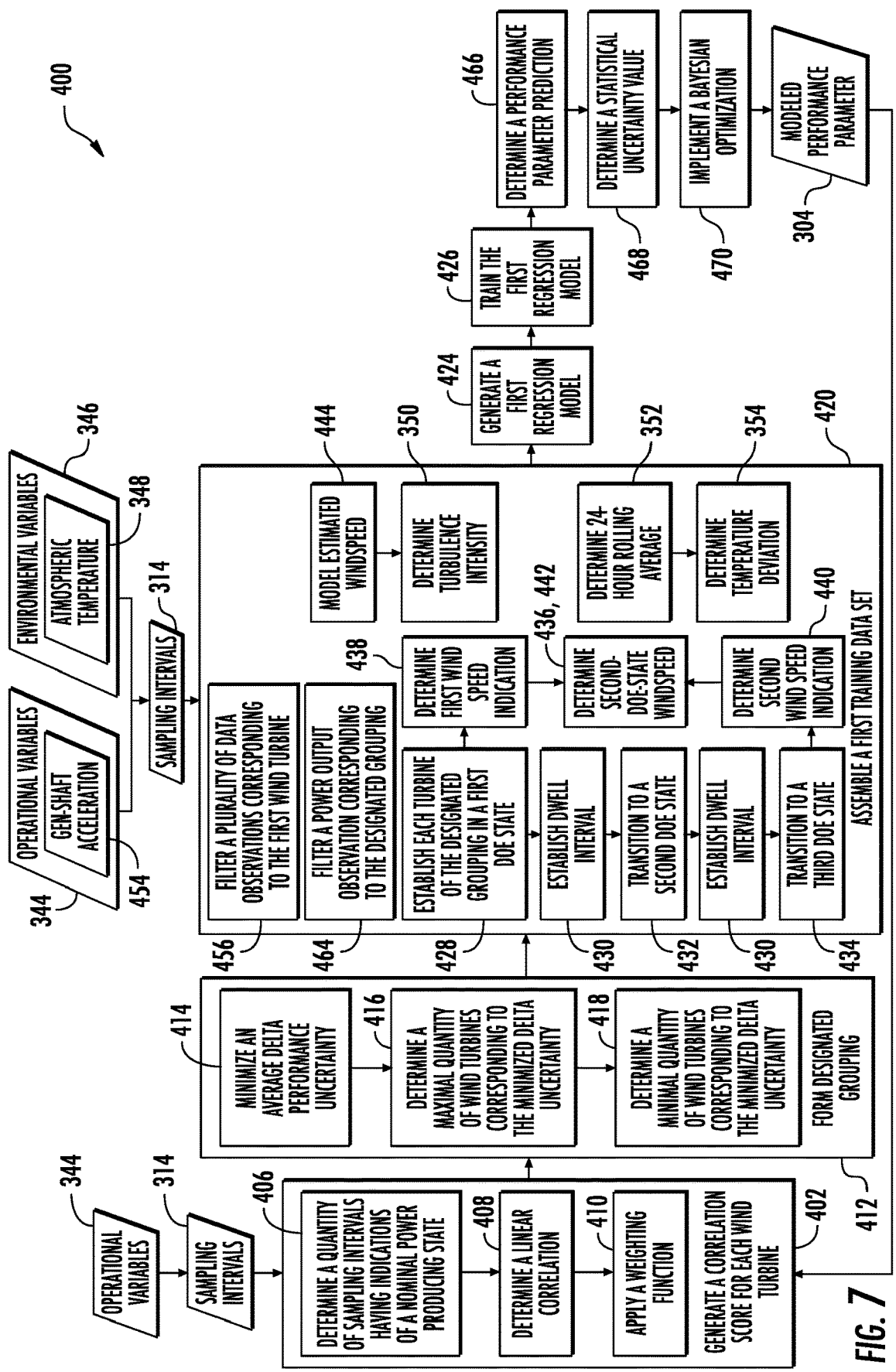
FIG. 7 illustrates a schematic diagram of a portion of the control logic of FIG. 6 according to the present disclosure.

Referring now in particular to FIG. 7, wherein various aspects of formation in employment of the first model 400 in multiple embodiments of the system 300 according to the present disclosure are presented. As the modeled performance parameter 304 may be based on the operation 308 of the designated grouping 310 (as depicted by a plurality of operational variables 344), it may be desirable that the performance of the particular wind turbines 100 of the wind farm 152 selected to form the designated grouping 310 correlate to the performance of the first wind turbine 306. As such, in order to select the designated grouping 310, it may be desirable to rank all of the wind turbines 100 of the wind farm 152 according to their correlation to the first wind turbine 306. As such, in an embodiment, the controller 200 may generate a correlation score 402 relative to the first wind turbine 306 for each wind turbine 100 of the plurality of wind turbines 100 of the wind farm 152.

In order to generate the correlation score 402, the controller 200 may, in an embodiment, determine a quantity 406 of sampling intervals 314 having indications of a power production in a nominal power producing state for both the first wind turbine 306 and each wind turbine 100 of the plurality of wind turbines. The quantity 406 may represent a co-power producing coincidence for the first wind turbine 306 and the wind turbines 100. By identifying the quantity 406 of sampling intervals in which both the first wind turbine 306 and the plurality of wind turbines 100 are operational and in a nominal operating state for the given environmental conditions, the controller 200 may identify such data points as may be more indicative of a value of the correlation between the performances of the first wind turbine 306 and the plurality wind turbines 100 than may be possible without consideration of the operating state of both. For example, in an embodiment, a wind turbine of the plurality of wind turbines 100 may correlate well to the first wind turbine 306 but may be only online rarely due to unrelated faults. Thus, while the correlation may be good, the wind turbine may not provide a sufficient number of observations to be of significant value in the generation of the modeled performance parameter 304.

In an embodiment, the controller 200 may determine a linear correlation 408 between the modeled performance parameter 304 and the performance of each of the plurality of wind turbines 100 of the wind farm 152 in order to determine/refine the correlation score 402. For example, the controller 200 may, in an embodiment, extrapolate a model-based estimation of the wind speed at the first wind turbine 306 and at each wind turbine 100 of the wind farm 152 respectively. The controller 200 may then compare observation by observation the model-based wind speed estimations to determine the linear correlation therebetween. In such an embodiment the performance of the wind turbines 100 having correlations closest to one may be deemed to be most valuable in predicting the modeled performance parameter 304.

As further depicted in FIG. 7, or to generate the correlation score 402, the controller 200 may apply a weighting function 410 to the quantity 406 of sampling intervals 314 and/or to the linear correlation 408. Each of the quantity 406 of sampling intervals 314 and the linear correlation 408 may be individually weighted so as to modify the impact of each on the final correlation score. It should be appreciated that the weighting of the factors may be determined based on operational considerations and/or historical data that informs an assessment of the correlation.

As depicted at 412, in an embodiment, the formation of designated grouping 310 of the wind turbines 100 may be based, at least in part, on the correlation score 402 for each wind turbine. For example, the controller 200 may designate particular wind turbines 100 of the wind farm 152 as key reference turbines based on the strength of the correlation between their performance and the performance of the first wind turbine 306, as indicated by the correlation score 402. It should be appreciated that this designation may, as depicted in FIG. 4, be made regardless of the physical location of the wind turbines 100 within the wind farm 152.

In an additional embodiment, forming the designated grouping 310 may include minimizing an average delta performance uncertainty 414 between differing design of experiment (DOE) states for the plurality of potential designated groupings via a Bayesian optimization. As such, a maximal quantity 416 of wind turbines 100 of the designated grouping 310 may be determined based on, and correspond to, the minimized average delta performance uncertainty 414. In an additional embodiment, a minimal quantity 418 of wind turbines 100 of the designated grouping 310 may be determined based on, and correspond to, the minimized average delta performance uncertainty 414.

It should be appreciated that the design of experiment corresponds to a field test conducted at the wind farm 152 during which the wind turbines 100 are operated at various setpoints in order to collect data for further analysis. Accordingly, the DOE states correspond to the various operating states of the wind turbines 100 as controlled by the various setpoints during the field test. The setpoint combinations may be toggled between individual DOE states and/or groupings of DOE states. The field test may, for example, have a total duration which encompasses a plurality of weeks of data points collected across a wide variety of operating states and environmental conditions. It should be appreciated that the field test may, in an embodiment be conducted across a plurality of nonconsecutive testing intervals, such as different seasons.

It should further be appreciated that the accuracy and/or validity of the modeled performance parameter 304 may be impacted by which wind turbines 100 of the wind farm 152 are assembled as part of the designated grouping 310. Accordingly, in an embodiment, it may be desirable to optimize the maximal and minimal quantities 416, 418 of wind turbines 100, the linear correlation, and the quantity 406 of sampling intervals 314. In at least one embodiment, this may be accomplished via a Bayesian optimization with the objective to minimize the average delta performance uncertainty 414 between different DOE states. In such an embodiment, the first model 400 may try different parameter combinations and develop a model/algorithm specifically for the optimization task. The algorithm may relate parameters to the objective of minimizing the average delta performance uncertainty 414. The first model 400 may search for the most optimal parameters while focusing on combinations wherein the minimization objective is advanced. While searching for optimal combinations, the first model 400 may be updated as new search iterations are completed. For example, 120 iterations may be completed to arrive at an acceptable parameter solution.

Referring still to FIG. 7, in an embodiment, determining the modeled performance parameter 304 may include assembling a first training data set 420. The first training data set 420 may include a plurality of operational variables 344 and environmental variables 346 corresponding at least to the designated grouping 310 of wind turbines 100. The operational and environmental variables 344, 346 may be monitored at the plurality of sampling intervals 314 and across a plurality of DOE states. It should be appreciated that the operational variables 344 may, in an embodiment, be obtained via the operational sensor(s) 158 of the wind turbines 100.

In an embodiment, the controller 200 may generate a first regression model 424 to form the first model 400. The first regression model 424 may be configured to predict the modeled performance parameter 304 For the first wind turbine 306 based on the operational and environmental variables 344, 346 corresponding to the designated grouping 310 of wind turbines 100. For example, the controller 200 may generate a regression model whereby the operational and environmental variables 344, 346 of the designated grouping 310 may be employed to predict the modeled performance parameter 304 for the first wind turbine 306.

As depicted at 426, in an embodiment, the controller 200 may be configured to train the first regression model 424. The training of the first regression model 424 may be based on the first training data set 420. Accordingly, machine learning techniques may be employed to iteratively refine the first regression model 424.

It should be appreciated that the data points/variables which may be desirable for the training of the first and second models 400, 500 may be obtained during the DOE and/or the operational employment of the wind farm 152. For example, the variables may include indications of average power generation, nacelle-anemometer measured average wind speed, model-based average wind speed, model-based wind speed standard deviation, yaw position, DOE states, average ambient temperature, generator speed, generator shaft acceleration, generator torque, generator power, filtering variables, and/or wind turbine identifiers. Such data points/variables may for example be recorded at one-second intervals. The one-second data may then be averaged to create longer duration average data observation. The averaged data observation may be employed in the training of the first and second models 400, 500. The one-minute timescale may be equivalent to an optimization frequency for the real-time optimization of the first wind turbine 306.

For example, in an embodiment, assembling the first training data set 420 at the plurality of sampling intervals 314 may include recording data indicative of the plurality of operational and environmental variables 344, 346 at each of a plurality of recording intervals of the plurality of sampling intervals 314. The recorded data may then be averaged at each sampling interval to generate a plurality of average data observations indicative of the plurality of operational and environmental variables 344, 346 of the first training data set 420.

Figure 9:
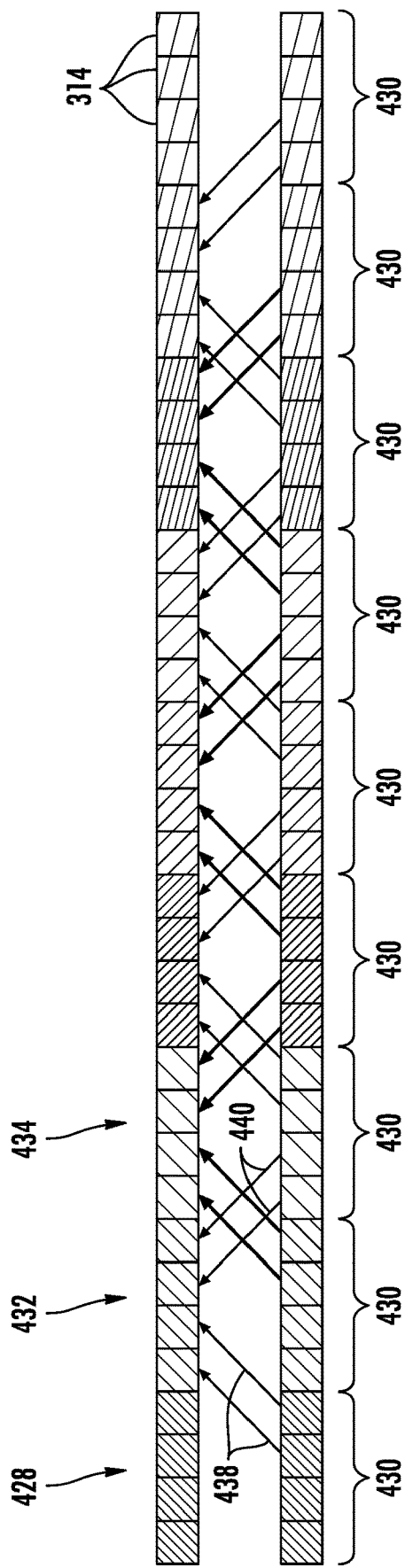
FIG. 9 presents a graphical representation of a plurality of design of experiments and sampling intervals according to the present disclosure.

Referring still to FIG. 7 and also to FIG. 9, in order to establish the first training data set 420, each wind turbine 100 of the designated grouping 310 may, in an embodiment, be established in a first DOE state 428. Additionally, a dwell interval 430 may be established wherein each wind turbine 100 of the designated grouping 310 is in the first DOE state 428 at the initiation of the dwell interval 430. In an embodiment, the dwell interval may have a duration of less than or equal to 10 minutes. At the conclusion of the dwell interval 430, each wind turbine 100 of designated grouping 310 may be transitioned to a second DOE state 432 and the dwell interval 430 may be reestablished. For example, each wind turbine 100 may be transitioned from one DOE state to another every several minutes during the field test. Similarly, the wind turbines 100 may be transitioned from the second DOE state 432 to a third DOE state 434 at the conclusion of the dwell interval 430.

It should be appreciated that the setpoints of the first DOE state 428 for one of the wind turbines 100 turbine may be different than the setpoints of the first DOE state 428 for another of the wind turbines 100. Accordingly, each of the wind turbines 100 may in the first DOE state 428 but at least two of the wind turbines 100 may be operating under different setpoint combinations. For example, the setpoints may be chosen via a purely random selection process so that all of the wind turbines 100 of the wind farm 152 do not receive the same setpoints at the same time unless by random chance.

Referring still in particular to FIGS. 7 and 9, in an embodiment, the environmental variables 346 may include a DOE-state wind speed 436. The DOE-state wind speed 436 may be indicative of a velocity of the wind (W) encountered by each wind turbine 100 of the designated grouping 310 during each dwell interval 430.

It should be appreciated that the wind speed affecting the wind turbines 100 may be an effective predictor of the performance of the first wind turbine 306. However, the accuracy of an anemometer coupled to the nacelle 106 may be affected by certain pitch and TSR setpoints. In an embodiment, this sensitivity to the pitch and TSR setpoints may be mitigated by wind speed measurements which are offset by time rather than monitored during a particular dwell interval. In other words, the controller 200 may be configured to combine wind speed measurements acquired during preceding and following DOE states to compute the DOE-state wind speed 436 for an intervening DOE state. Therefore, the controller 200 may be configured to employ offset toggle wind speed measurements to determine the wind speed of the intervening DOE state rather than direct measurement while in the intervening DOE state. As the DOE states may be selected at random during the field experiment, offset toggle wind speeds may be recorded at a corresponding random DOE state per every observation. Accordingly, when combining all offset toggle wind speed measurements for a given dwell interval 430 the resultant observations may be balanced, and the resultant DOE-state wind speed 436 may be an unbiased wind speed measurement.

For example, as depicted in FIG. 9, in an embodiment, in order to determine the DOE-state wind speed 436 for the second DOE state 432, a first wind speed indication 438 may be acquired in each of the final two sampling intervals 314 (e.g., the final two minutes) of the dwell interval 430 (e.g., a four-minute dwell interval 430) corresponding to the first DOE state 428. When the wind turbines 100 transition from the second DOE state 432 to the third DOE state 434, a second wind speed indication 440 may be acquired in the first two sampling intervals 314 (e.g., the first two minutes) of the dwell interval 430 (e.g., a four-minute dwell interval 430) corresponding to the third DOE state 434.

In an embodiment, the controller 200 may be configured to determine the second-DOE-state wind speed 442 by combining the first wind speed indication 438 and the second wind speed indication 440. The second-DOE-state wind speed 442 may be indicative of the wind speed encountered by each wind turbine 100 of the designated grouping 310 during the dwell interval 430 associated with the second DOE state 432. The determination of the second-DOE-state wind speed 442 via the combination may preclude a recording of data indicative of the second-DOE-state wind speed 442 while each wind turbine 100 of the designated grouping 310 is in the second DOE state 432.

Referring again in particular to FIG. 7, in an embodiment, assembling the first training data set 420 at the plurality of sampling intervals 314 may include modeling, via the controller and estimated wind speed 444 for each wind turbine 100 of the designated grouping 310 at each of the plurality of sampling intervals 314. Additionally, the controller 200 may be configured to determine a turbulence intensity 350 for each wind turbine 100 of the designated grouping 310 at each of the plurality of sampling intervals 314 based, at least in part, on the estimated wind speed 444 as modeled. It should be appreciated that determining the turbulence intensity 350 based on a modeled wind speed may mitigate the effects of certain pitch and TSR setpoints on the wind speed measurement. It should, however, be appreciated that in an embodiment wherein sufficient confidence in the measured wind speed values exist, the turbulence intensity may be determined based on indications of wind speed as monitored by the environmental sensor(s) 156.

In an embodiment, assembling the first training data set 420 at the plurality sampling intervals 314 may include receiving data indicative of atmospheric temperature 348. The atmospheric temperature 348 may be the temperature affecting each wind turbine 100 of the designated grouping 310 at each of the plurality of sampling intervals 314. In such an embodiment, the controller 200 may be configured to determine a rolling average temperature 352 for each wind turbine 100 of the designated grouping 310. For example, the rolling average temperature 352 may be a 24-hour rolling average. Additionally, the controller 200 may determine a temperature deviation 354 for each wind turbine 100 of the designated grouping 310 at each of the plurality of sampling intervals 314. The temperature deviation 354 may correspond to a difference between the data indicative of the atmospheric temperature 348 and the rolling average temperature over the course of hours 352 at each of the plurality of sampling intervals 314. It should be appreciated that the temperature deviation 354 may serve as a surrogate metric for understanding the impacts of windshear and/or turbulence intensity on the wind turbines 100 of the designated grouping 310.

In order to accurately determine the power output of the wind turbine(s) 100 in response to the environmental conditions, it may be desirable to account for the portion of kinetic energy developed by the rotor 108 which may be impacted by an acceleration and/or deceleration of the generator 118. Accordingly, in an embodiment the assembly of the first training data set 420 may include receiving, via the controller, data indicative of a generator-shaft acceleration 454 for each wind turbine 100 of the designated grouping 310 of each of the plurality of sampling intervals 314. The data indicative of the generator-shaft acceleration 454 may be indicative of a portion of kinetic energy extracted from the wind (W) by the rotor 108. It should be appreciated that including the data indicative of the generator-shaft acceleration 454 in the training data set may facilitate a more accurate prediction of the actual power captured from the wind (W) in response to the setpoint combinations 320 than may be otherwise obtainable.

The accuracy of the first regression model 424 may be impacted if the first training data set 420 includes outlier data points. Accordingly, it may be desirable to ensure that the first training data set 420 is cleared of outlier data points. As such, filters may be applied to the operational and/or environmental variables 344, 346. For example, in an embodiment, the controller 200 may be configured to apply a wind speed filter to filter out wind speed operations at or above the rated windspeed of the wind turbines 100 as well as below a cut-in windspeed. In additional embodiments, the controller 200 may employ a turbulence intensity filter and/or a wind direction filter to exclude data points exceeding a corresponding threshold for each.

In a further embodiment, the controller 200 may employ a toggle-transient filter. The toggle transient filter may ensure that the pitch and TSR setpoint control has stabilized after a DOE state toggle. As such, the toggle-transient filter may be employed to exclude observations recorded during the first sampling interval after a toggle has occurred.

Figure 10:
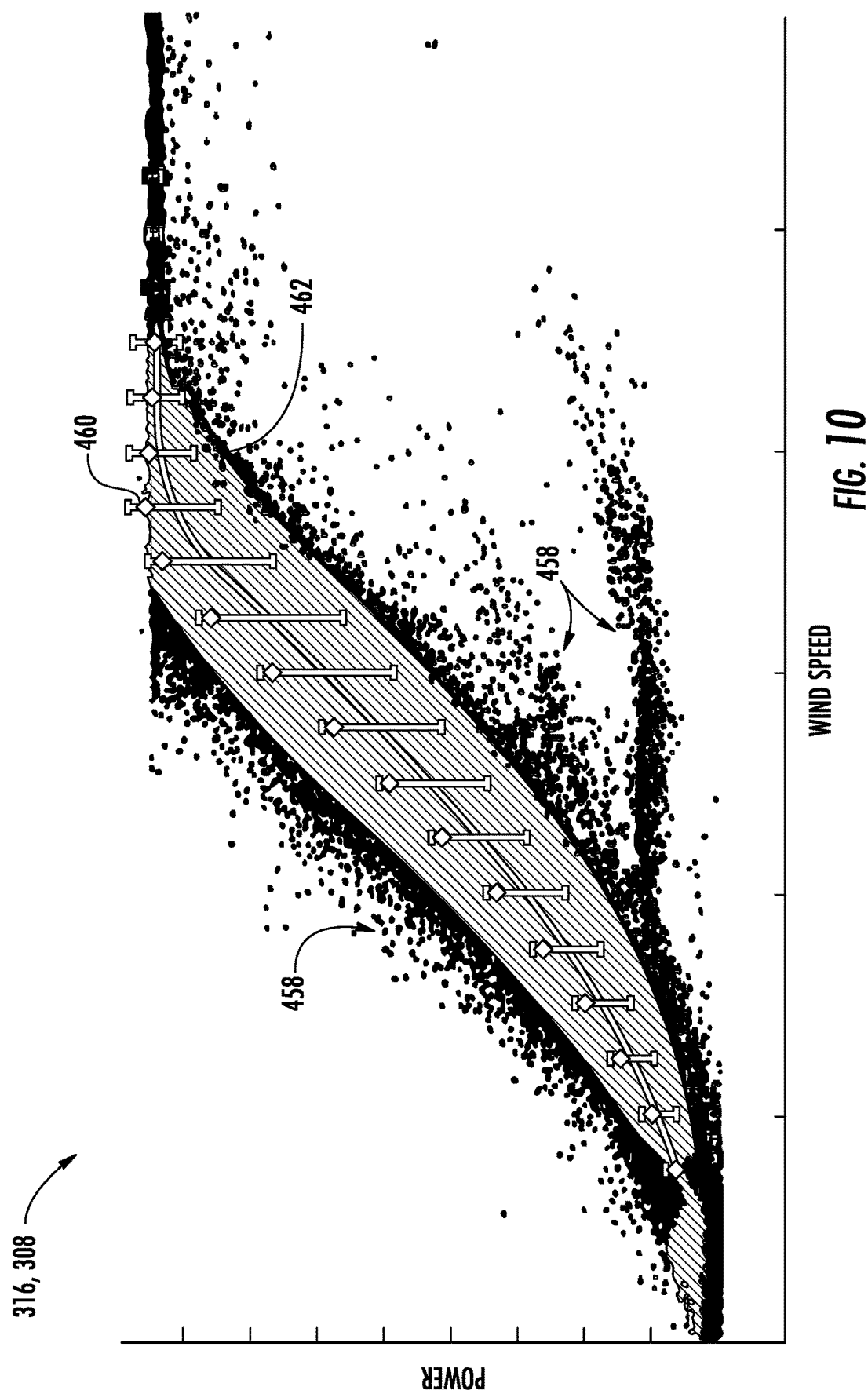
FIG. 10 presents a graphical representation of a plurality of data observations and a standard deviation limit according to the present disclosure.

As depicted in FIG. 10, the controller 200 may, at 456, filter a plurality of data observations indicative of the plurality of operational variables 344 corresponding to the first wind turbine 306 and a plurality of environmental variables 346 affecting the first wind turbine. This filtering may preclude an inclusion of a plurality of data observations 458 having a deviation 460 greater than a standard deviation limit 462. It should be appreciated that similar filters may be applied to each wind turbine 100 of the designated grouping 310. In such embodiments, the filter may, for example, be a power curve outlier filter.

As depicted at 464, in an embodiment, assembling the first training data set 420 may include filtering a power output observation corresponding to a power output for each wind turbine 100 of the designated grouping 310 so as to preclude an inclusion of at least one power output observation having a deviation greater than a standard deviation limit. It should be appreciated that high variances in the performances of the wind turbines 100 of designated grouping 310 (e.g., very different power outputs at any given time) may decrease the accuracy of the modeled performance parameter 304. Accordingly, it may be desirable to filter data received from a portion of the designated grouping 310 when the variance of the performance of the portion exceeds the standard deviation limit.

It should be appreciated that once the first regression model 424 is generated and trained, the modeled performance parameter 304 may be predicted and/or cross validated using the same training data. This may, in an embodiment, create an objective performance reference based on the operational and environmental variables 344, 346.

Referring again to FIG. 7, in an embodiment, determining the modeled performance parameter 304 may include an optimization of the first regression model 424. Accordingly, once the first regression model 424 is trained, the controller 200 may be configured to determine a performance parameter prediction 466. A confidence in the prediction may then be quantified by the controller by determining a statistical uncertainty value 468 for the performance parameter prediction 466. It should be appreciated that the statistical uncertainty value 468 may be employed to assess the performance of the first regression model 424. As such, when warranted by the statistical uncertainty value 468, the controller 200 may, as depicted at 470, implement a Bayesian optimization of the first regression model 424.

Figure 8:
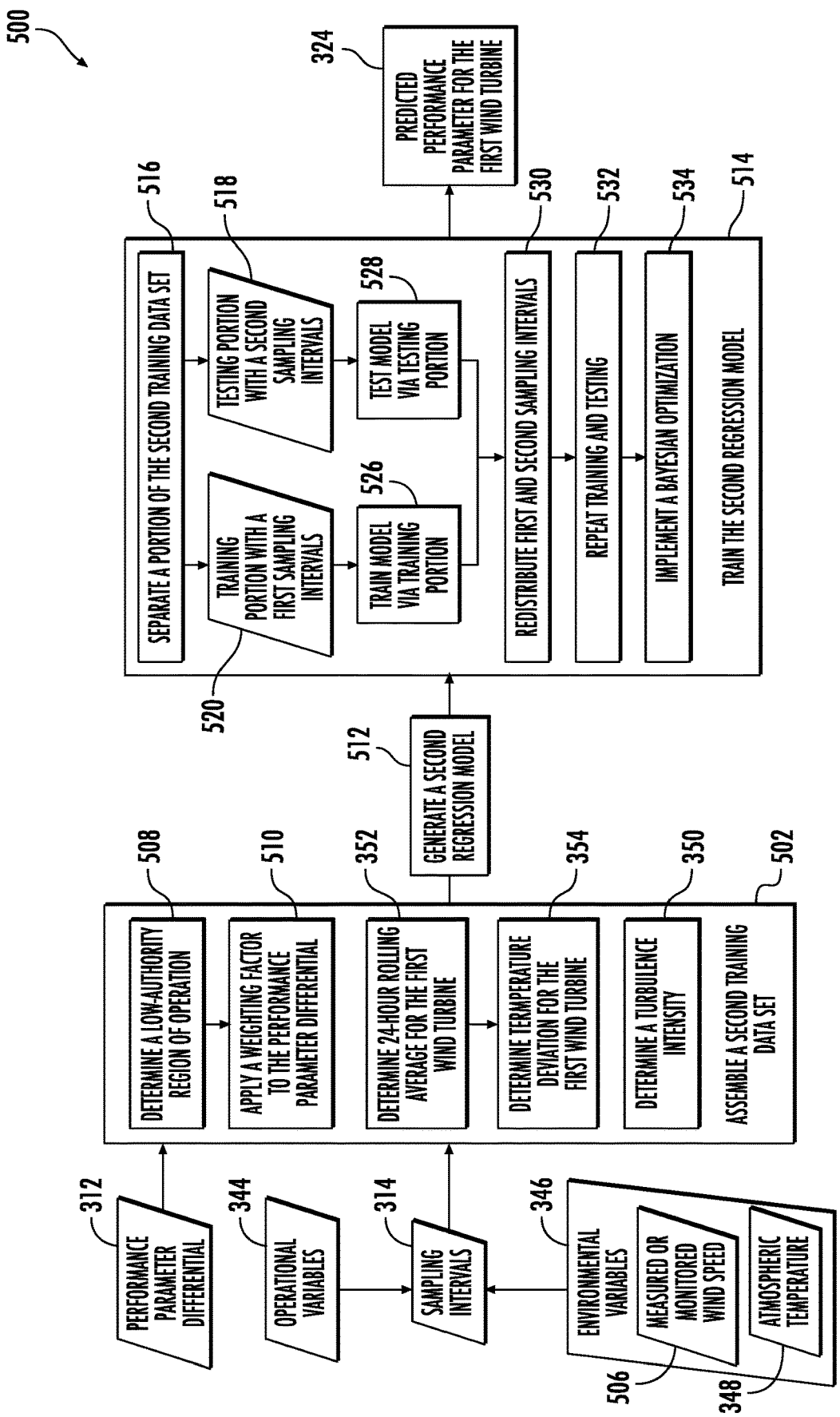
FIG. 8 illustrates a schematic diagram of a portion of the control logic of FIG. 6 according to the present disclosure.

Referring now to FIG. 8 wherein a schematic diagram of a portion of the control logic of the system 300 is depicted. In particular, FIG. 8 depicts various embodiments/implementations of the second model 500 configured to determine the predicted performance parameter 324 of the first wind turbine 306 at each of the setpoint combinations 320 of the plurality of setpoint combinations 318. Accordingly, a second training data set 502 may be assembled. The second training data set 502 may include the plurality of operational variables 344 and the plurality of environmental variables 346. The plurality of operational and environmental variables 344, 346 may correspond at least to the first wind turbine 306 and to the designated grouping 310 of wind turbines 100. The operational and environmental variables 344, 346 may, in an embodiment, be monitored at the plurality of sampling intervals 314 and DOE states.

The second training data set 502 may be tailored/optimized to include predictors which best capture the environmental conditions affecting the first wind turbine 306. For example, turbulence intensity 350 may be considered to be a valuable predictor of wind stability and/or windshear. Accordingly, in an embodiment, the controller 200 may be configured to determine the turbulence intensity 350 for both the wind turbines 100 of the designated grouping 310 and the first wind turbine 306. The turbulence intensity 350 may be determined at each of the plurality of sampling intervals 314. In an embodiment, the turbulence intensity 350 may be based, at least in part, on a measured or monitored wind speed 506. In an embodiment, the turbulence intensity 350 may be based, at least in part, on an estimated wind speed (e.g., a model-based wind speed). It should be appreciated that the utilization of an estimated wind speed may mitigate known nacelle anemometer sensitivities to pitch and/or TSR settings.

It should be appreciated that the environmental variables 346 may indicate wind condition patterns which may be diurnal and driven by solation and temperature changes (e.g., the environmental variables 346 may be cyclical). For example, during periods of daylight, higher natural convection currents may result in relatively high turbulence intensity 350. In contrast, during periods of darkness, the wind (W) may be relatively more stable and, thus, indicate a higher degree of shear than may be observed during periods of daylight. This trend may be indicated by a difference between the atmospheric temperature 348 and the rolling average 352.

It should further be appreciated that such a measure of temperature deviation 354 may be preferred over an absolute temperature measurement. For example, the utilization of the temperature deviation 354 may facilitate the adaptation of the second model 500 to seasonal variations. By way of illustration, if the environmental variables 346 are obtained only during a summer season, then a transition of the wind turbine(s) 100 into colder periods during optimization would introduce an unacceptable degree of inaccuracy into the second model 500. This inaccuracy may be due to the second model 500 lacking training in the colder temperatures. However, the utilization of the temperature deviation 354 may mitigate this possibility, as the temperature deviation 354 may be more consistent across various testing periods (e.g., seasons).

In order to assemble/tailor the second training data set 502 to account for the cyclical nature temperatures, the controller 200 may, in an embodiment, be configured to receive data indicative of the atmospheric temperature 348 affecting the first wind turbine 306 at each of the plurality of sampling intervals 314. The controller 200 may also be configured to determine the rolling average temperature 352 for the first wind turbine 306. Additionally, the controller 200 may, in an embodiment, be configured to determine the temperature deviation 354 for the first wind turbine 306 at each of the plurality of sampling intervals 314. The temperature deviation 354 may correspond to a difference between the data indicative of the atmospheric temperature 348 and the rolling average temperature 352 at each of the plurality of sampling intervals 314.

During certain conditions, the system 300 may have relatively little authority to control (e.g., optimize) pitch and/or TSR setpoints. For example, when operating under certain wind conditions, such as such as wind speeds above or below a nominal operating range, operational limits of the wind turbine(s) 100 may preclude the implementation of optimized pitch and/or TSR setpoints. As such, it may be desirable to direct the optimization of the second model 500 toward conditions wherein the system 300 may have an acceptable degree of authority over the control the operations of the first wind turbine 306. This optimization may be achieved via a tailoring of the second training data set 502.

Tailoring the second training data set 502 to optimize the second model 500 for conditions wherein the system 300 has an acceptable degree of authority may include determining/ identifying at least one low-authority region of operation 508 of the first wind turbine 306. The low-authority region of operation 508 may correspond to a range of operating conditions within which the implementation of a desired command setpoint may be limited, restricted, or overridden based on a preeminent operational limit of the first wind turbine 306. In such a range of operating conditions, the desired command setpoint may be desynchronized from an optimal rotor speed and/or pitch setting. In other words, due to operational limits, the controller 200 may prioritize a setpoint which may differ from the optimal rotor speed and/or pitch setting.

In an embodiment wherein the controller 200 determines that the operational and/or environmental variables 344, 346 correspond to the low-authority region 508, the controller 200 may apply a weighting factor 510 to the performance parameter differential 312. The weighting factor 510 may be configured to reduce an impact, or effect, of the performance parameter differential 312 on the predicted performance parameter 324 generated by the second model 500. For example, in an embodiment, the performance parameter differential 312 may be multiplied by a factor which reduces the value of the performance parameter differential 312 toward zero. However, in an embodiment wherein the system 300 has an sufficient/acceptable degree of authority to control the first wind turbine 306, the weighting factor 510 may equal one. In such an embodiment, the performance parameter differential 312 may have a maximal impact/ effect on the predicted performance parameter 312.

Referring still to FIG. 8, in an embodiment, implementing the second model 500 may include generating, via the controller 200, a second regression model 512. The second regression model 512 may, in an embodiment, be configured to determine the predicted performance parameter 324 for the first wind turbine 306. This determination may be based on the operational and environmental variables 344, 346 and the performance parameter differential 312. For example, the controller 200 may generate a support-vector-machine regression model whereby the performance parameter differential 312 and the operational and environmental variables 344, 346 for the first wind turbine 306 may be employed to model the predicted performance parameter 324 for the first wind turbine 306 at each of the plurality of setpoint combinations 318.

As depicted at 514, the controller 200 may be configured to train the second regression model 512 based on the second training data set 502. Accordingly, machine learning techniques may be employed to iteratively refine the second regression model 512. It should be appreciated that refining the second regression model 512 may facilitate an increased accuracy in the performance parameter predictions based on the performance parameter differential 312 at each of the setpoint combinations 320.

Figure 11:
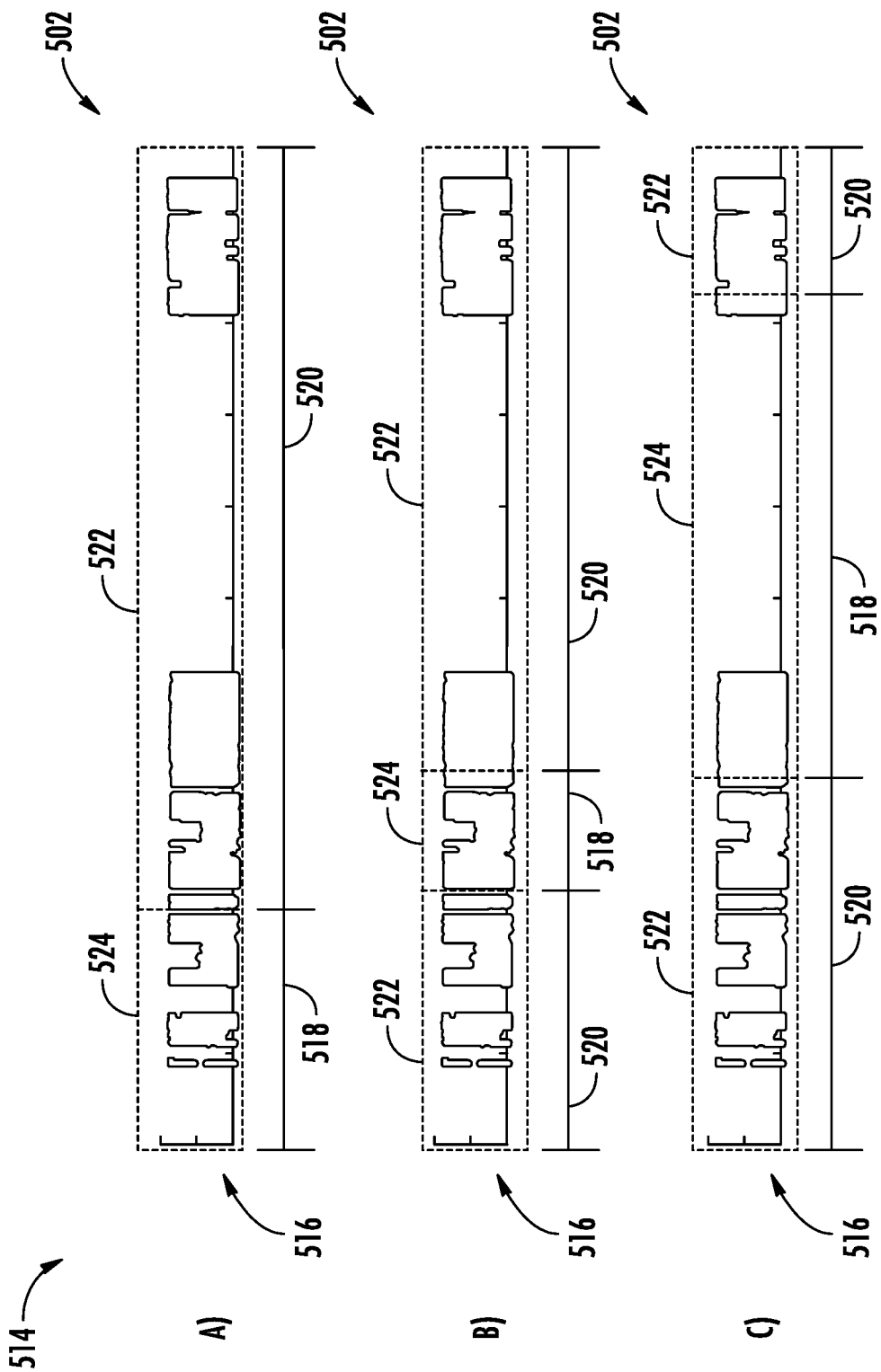
FIG. 11 presents multiple divisions of a portion a training data set into a training portion and a testing portion so as to facilitate cross-validation testing according to the present disclosure.

In an embodiment, such as depicted in FIG. 11, training the second regression model 512 may include testing of the second regression model 512 via a plurality of training and testing iterations (depicted in FIG. 11 as iterations (A), (B) and (C)). In such an embodiment, a portion 516 of the second training data 502 may be separated into a testing portion 518 and a training portion 520. The training portion 520 may have a first plurality of sampling intervals 522. In an embodiment, the testing portion 518 may have a second plurality of sampling intervals 524. The training portion 520 may, in an embodiment, include a greater quantity of sampling intervals 314 relative to the testing portion 518. For example, in an embodiment, the testing data may include of 40% of the sampling intervals 314 while the training data comprises the remaining 60%. It should be appreciated that the testing portion 518 may be excluded from the training of the second regression model 512.

As depicted at 526, testing the second regression model 512, may include training the second regression model 512 via the training portion 520 to the exclusion of the testing portion 518. Following the training, at 526, of the second regression model 512, the second regression model 512 may, as depicted at 528, be tested via the testing portion 518.

Following the training and testing, at 526 and 528, of the second regression model 512, the training and testing portions 518, 520 may, as depicted at 530, be reformed by redistributing the first and second pluralities of sampling intervals 522, 524 of the portion 516 of the second training data set 502. For example, as depicted in FIG. 11, the pluralities of sampling intervals 522, 524 may have a first distribution in iteration (A), a second distribution in iteration (B), a third distribution in iteration (C), and so on. As depicted at 532, the training and testing of the second regression model 512 may be repeated for each iteration. For example, in an embodiment, ten iterations of the training and testing may be accomplished across ten distributions of the first and second pluralities of sampling intervals 522, 524. Repeating the training and testing of the second regression model 512 may facilitate a cross-validation test of the second regression model 512 and, therefore, of the second model 500. It should further be appreciated that the training and testing steps discussed above may similarly be utilized to train and test the first regression model 424.

As depicted at 534, the controller 200 may be configured to implement a Bayesian optimization to maximize the predicted performance parameter 324 for the cross-validation test. In an embodiment, the controller 200 may utilize an optimization model specifically configured for the optimization task. The optimization model may search for optimal parameters while focusing on configurations wherein the second regression model 512 predicts the maximal predictive performance parameter 324, while exploring other options. For example, the optimization model may seek to maximize a predicted performance improvement metric using results from the first regression model 424. In an additional example, the optimization model may seek to minimize error of the first regression model 424.

It should be appreciated that while searching for the optimal parameters, the optimization model may be updated as new search iterations are completed. As such, in an exemplary embodiment, 60 iterations may be required to arrive at an acceptable parameter solution.

Referring again to FIG. 6 in particular, in an embodiment, the plurality of setpoint combinations 318 may include a plurality of tested setpoint combinations 356 corresponding to a plurality of DOE states. As such, determining the predicted performance parameter 324 for the first wind turbine 306 at each of the plurality of setpoint combinations 318 may include determining a predicted power output for each of the plurality of tested setpoint combinations 356. Accordingly, a setpoint combination 320 of the plurality of tested setpoint combinations 356 may be selected which maximizes the predicted power output of the first wind turbine 306.

In an embodiment, the plurality of tested setpoint combinations 356 may include a plurality of setpoints and/or a plurality of TSR setpoints. As such, the selected setpoint combination 320 may include a pitch setpoint and/or a TSR setpoint which maximizes the predicted power output of the first wind turbine 306 in response to the current environmental conditions.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a first wind turbine of a plurality of wind turbines of a wind farm, the method comprising: determining a modeled performance parameter for the first wind turbine via a first model implemented by a controller, the modeled performance parameter being based, at least in part, on an operation of a designated grouping of wind turbines of the plurality of wind turbines, wherein the designated grouping is exclusive of the first wind turbine; determining, via the controller, a performance parameter differential for the first wind turbine at a plurality of sampling intervals, the performance parameter differential being indicative of a difference between the modeled performance parameter and a monitored performance parameter for the first wind turbine; implementing a second model, via the controller, to determine a predicted performance parameter of the first wind turbine at each of a plurality of setpoint combinations based, at least in part, on the performance parameter differential of the first wind turbine; selecting, via the controller, a setpoint combination of the plurality of setpoint combinations based on the predicted performance parameter; and changing an operating state of the first wind turbine based on the setpoint combination.

Clause 2. The method of clause 1, wherein determining the modeled performance parameter further comprises: generating, via the controller, a correlation score for each of the plurality of wind turbines relative to the first wind turbine; forming the designated grouping of wind turbines based, at least in part, on the correlation score for each of the plurality of wind turbines; assembling a first training data set comprising a plurality of operational and environmental variables corresponding at least to the designated grouping of wind turbines monitored at the plurality of sampling intervals and across a plurality of design of experiment (DOE) states wherein the plurality of setpoint combinations are toggled; generating, via the controller, a first regression model configured to predict the modeled performance parameter for the first wind turbine based on the operational and environmental variables corresponding to the designated grouping of wind turbines; and training, via the controller, the first regression model based on the first training data set.

Clause 3. The method of any preceding clause, wherein generating the correlation score further comprises: determining, via the controller, a quantity of sampling intervals having indications of a power production in a nominal power producing state for both the first turbine and each of the plurality of wind turbines; determining, via the controller, a linear correlation between the modeled performance parameter and the performance of each of the plurality of wind turbines; and applying, via the controller, a weighting function to the quantity of sampling intervals and the linear correlation so as to generate the correlation score.

Clause 4. The method of any preceding clause, wherein assembling the first training data set further comprises: establishing each wind turbine of the designated grouping in a first DOE state; establishing a dwell interval, wherein each wind turbine of the designated grouping is in the first DOE state at an initiation of the dwell interval; and transitioning each wind turbine of the designated grouping to a second DOE state at a conclusion of the dwell interval.

Clause 5. The method of any preceding clause, wherein the environmental variables include a DOE-state wind speed encountered by each wind turbine of the designated grouping during each dwell interval, and wherein assembling the first training data set further comprises: determining a first wind speed indication for each wind turbine of the designated grouping in the first DOE state; transitioning each wind turbine of the designated grouping to a third DOE state from the second DOE state following the dwell interval of the second DOE state; determining a second wind speed indication for each wind turbine of the designated grouping in the third DOE state; and determining a second-DOE-state wind speed by combining the first wind speed indication and the second wind speed indication, the second-DOE-state wind speed being indicative of the wind speed encountered by each wind turbine of the designated grouping during the dwell interval associated with the second DOE state, wherein the determination of the second-DOE-state wind speed via the combination precludes a recording of data indicative of the second-DOE-state wind speed while each wind turbine of the designated grouping is in the second DOE state.

Clause 6. The method of any preceding clause, wherein assembling the first training data set at the plurality of sampling intervals further comprises: modeling, via the controller, an estimated wind speed for each wind turbine of the designated grouping at each of the plurality of sampling intervals; and determining, via the controller, a turbulence intensity for each wind turbine of the designated grouping at each of the plurality of sampling intervals based, at least in part, on the estimated wind speed as modeled.

Clause 7. The method of any preceding clause, wherein assembling the first training data set at the plurality of sampling intervals further comprises: receiving, via the controller, data indicative of an atmospheric temperature affecting each wind turbine of the designated grouping at each of the plurality of sampling intervals; determining, via the controller, a rolling average temperature for each wind turbine of the designated grouping; and determining, via the controller, a temperature deviation for each wind turbine of the designated grouping at each of the plurality of sampling intervals corresponding to a difference between the data indicative of the atmospheric temperature and the rolling average temperature at each of the plurality of sampling intervals.

Clause 8. The method of any preceding clause, wherein assembling the first training data set at the plurality of sampling intervals further comprises: receiving, via the controller, data indicative of a generator-shaft acceleration for each wind turbine of the designated grouping at each of the plurality of sampling intervals, wherein the data indicative of the generator-shaft acceleration is indicative of a portion of kinetic energy extracted from a wind.

Clause 9. The method of any preceding clause, wherein assembling the first training data set at the plurality of sampling intervals further comprises: filtering, via the controller, a plurality of data observations indicative of the plurality of operational variables of the first wind turbine and a plurality of environmental variables affecting the first wind turbine, wherein filtering the plurality of data observations precludes an inclusion of data observations having a deviation greater than a standard deviation limit.

Clause 10. The method of any preceding clause, wherein assembling the first training data set at the plurality of sampling intervals further comprises: filtering a power output observation corresponding to a power output for each wind turbine of the designated grouping so as to preclude an inclusion of at least one power output observation having a deviation greater than a standard deviation limit.

Clause 11. The method of any preceding clause, wherein determining the modeled performance parameter further comprises: following the training of the first regression model, determining, via the controller, a performance parameter prediction; determining, via the controller, a statistical uncertainty value for the performance parameter prediction; and implementing, via the controller, a Bayesian optimization of the first regression model based on the statistical uncertainty.

Clause 12. The method of any preceding clause, wherein forming the designated grouping further comprises: minimizing an average delta performance uncertainty between differing DOE states for a plurality of potential designated groupings via a Bayesian optimization; determining a maximal quantity of wind turbines of the designated grouping corresponding to the minimized delta performance uncertainty; and determining a minimal quantity of wind turbines of the designated grouping corresponding to the minimized delta performance uncertainty.

Clause 13. The method of any preceding clause, wherein implementing the second model further comprises: assembling a second training data set comprising a plurality of operational and environmental variables and the performance parameter differential for the first wind turbine, the plurality of operational and environmental variables corresponding at least to the designated grouping of wind turbines monitored at the plurality of sampling intervals and DOE states and the first wind turbine; generating, via the controller, a second regression model configured to determine the predicted performance parameter for the first wind turbine based on the operational and environmental variables and the performance parameter differential; and training, via the controller, the second regression model based on the second training data set.

Clause 14. The method of any preceding clause, wherein assembling the second training data set further comprises:

determining, via the controller, a turbulence intensity for each wind turbine of the designated grouping and the first wind turbine at each of the plurality of sampling intervals based, at least in part, on an estimated wind speed as modeled or a measured wind speed.

Clause 15. The method of any preceding clause, wherein assembling the second training data set further comprises: receiving, via the controller, data indicative of an atmospheric temperature affecting the first wind turbine at each of the plurality of sampling intervals; determining, via the controller, a rolling average temperature for the first wind turbine; and determining, via the controller, a temperature deviation for the first wind turbine at each of the plurality of sampling intervals corresponding to a difference between the data indicative of the atmospheric temperature and the rolling average temperature at each of the plurality of sampling intervals.

Clause 16. The method of any preceding clause, wherein assembling the second training data set further comprises: determining, via the controller, at least one low-authority region of operation of the first wind turbine, the at least one low-authority region corresponding to a range of operating conditions within which a desired command setpoint is limited based on an operational limit of the first wind turbine and is desynchronized from an optimal rotor speed or pitch setting; and applying, via the controller, a weighting factor to the performance parameter differential when the operational and environmental variables correspond to the at least one low-authority region, the weighting factor being configured to reduce an impact of the performance parameter differential on the predicted performance parameter.

Clause 17. The method of any preceding clause, wherein training the second regression model further comprises: separating a portion of the second training data set into a training portion having a first plurality of sampling intervals and a testing portion having a second plurality of sampling intervals, wherein the training portion comprises a greater quantity of sampling intervals relative to the testing portion; training the second regression model via the training portion; testing the second regression model via the testing portion; reforming the training portion and the testing portion by redistributing the first and second pluralities of sampling intervals of the portion of the second training data set; and repeating the training and testing of the second regression model, wherein repeating the training and testing of the second regression model facilitates a cross-validation test of the second regression model.

Clause 18. The method of any preceding clause, further comprising: implementing, via the controller, a Bayesian optimization to maximize the predicted performance parameter for the cross-validation test.

Clause 19. The method of any preceding clause, wherein the plurality of setpoint combinations comprise a plurality of tested setpoint combinations corresponding to a plurality of DOE states, and wherein determining the predicted performance parameter of the first wind turbine at each of the plurality of setpoint combinations further comprises: determining a predicted power output for each of the tested setpoint combinations; and selecting a setpoint combination of the tested setpoint combinations which maximizes the predicted power output of the first wind turbine.

Clause 20. The method of any preceding clause, wherein the plurality of tested setpoint combinations comprise a plurality of pitch setpoints and a plurality of tip speed ratio (TSR) setpoints, and wherein the selected setpoint combination comprises a pitch setpoint and a TSR setpoint which maximizes the predicted power output of the first wind turbine.

What is claimed is:

1. A method for controlling a first wind turbine of a plurality of wind turbines of a wind farm, the method comprising:
   determining a modeled performance parameter for the first wind turbine via a first model implemented by a controller, the modeled performance parameter being based, at least in part, on an operation of a designated grouping of wind turbines of the plurality of wind turbines, wherein the designated grouping is exclusive of the first wind turbine;
   determining, via the controller, a performance parameter differential for the first wind turbine at a plurality of sampling intervals, the performance parameter differential being indicative of a difference between the modeled performance parameter and a monitored performance parameter for the first wind turbine;
   implementing a second model, via the controller, to determine a predicted performance parameter of the first wind turbine at each of a plurality of setpoint combinations based, at least in part, on the performance parameter differential of the first wind turbine;
   selecting, via the controller, a setpoint combination of the plurality of setpoint combinations based on the predicted performance parameter; and
   changing an operating state of the first wind turbine based on the setpoint combination.

2. The method of claim 1, wherein determining the modeled performance parameter further comprises:
   generating, via the controller, a correlation score for each of the plurality of wind turbines relative to the first wind turbine;
   forming the designated grouping of wind turbines based, at least in part, on the correlation score for each of the plurality of wind turbines;
   assembling a first training data set comprising a plurality of operational and environmental variables corresponding at least to the designated grouping of wind turbines monitored at the plurality of sampling intervals and across a plurality of design of experiment (DOE) states wherein the plurality of setpoint combinations are toggled;
   generating, via the controller, a first regression model configured to predict the modeled performance parameter for the first wind turbine based on the operational and environmental variables corresponding to the designated grouping of wind turbines; and
   training, via the controller, the first regression model based on the first training data set.

3. The method of claim 2, wherein generating the correlation score further comprises:
   determining, via the controller, a quantity of sampling intervals having indications of a power production in a nominal power producing state for both the first turbine and each of the plurality of wind turbines;
   determining, via the controller, a linear correlation between the modeled performance parameter and the performance of each of the plurality of wind turbines; and
   applying, via the controller, a weighting function to the quantity of sampling intervals and the linear correlation so as to generate the correlation score.

4. The method of claim 2, wherein assembling the first training data set further comprises:
 establishing each wind turbine of the designated grouping in a first DOE state;
 establishing a dwell interval, wherein each wind turbine of the designated grouping is in the first DOE state at an initiation of the dwell interval; and
 transitioning each wind turbine of the designated grouping to a second DOE state at a conclusion of the dwell interval.

5. The method of claim 4, wherein the environmental variables include a DOE-state wind speed encountered by each wind turbine of the designated grouping during each dwell interval, and wherein assembling the first training data set further comprises:
 determining a first wind speed indication for each wind turbine of the designated grouping in the first DOE state;
 transitioning each wind turbine of the designated grouping to a third DOE state from the second DOE state following the dwell interval of the second DOE state;
 determining a second wind speed indication for each wind turbine of the designated grouping in the third DOE state; and
 determining a second-DOE-state wind speed by combining the first wind speed indication and the second wind speed indication, the second-DOE-state wind speed being indicative of the wind speed encountered by each wind turbine of the designated grouping during the dwell interval associated with the second DOE state, wherein the determination of the second-DOE-state wind speed via the combination precludes a recording of data indicative of the second-DOE-state wind speed while each wind turbine of the designated grouping is in the second DOE state.

6. The method of claim 2, wherein assembling the first training data set at the plurality of sampling intervals further comprises:
 modeling, via the controller, an estimated wind speed for each wind turbine of the designated grouping at each of the plurality of sampling intervals; and
 determining, via the controller, a turbulence intensity for each wind turbine of the designated grouping at each of the plurality of sampling intervals based, at least in part, on the estimated wind speed as modeled.

7. The method of claim 2, wherein assembling the first training data set at the plurality of sampling intervals further comprises:
 receiving, via the controller, data indicative of an atmospheric temperature affecting each wind turbine of the designated grouping at each of the plurality of sampling intervals;
 determining, via the controller, a rolling average temperature for each wind turbine of the designated grouping; and
 determining, via the controller, a temperature deviation for each wind turbine of the designated grouping at each of the plurality of sampling intervals corresponding to a difference between the data indicative of the atmospheric temperature and the rolling average temperature at each of the plurality of sampling intervals.

8. The method of claim 2, wherein assembling the first training data set at the plurality of sampling intervals further comprises:
 receiving, via the controller, data indicative of a generator-shaft acceleration for each wind turbine of the designated grouping at each of the plurality of sampling intervals, wherein the data indicative of the generator-shaft acceleration is indicative of a portion of kinetic energy extracted from a wind.

9. The method of claim 2, wherein assembling the first training data set at the plurality of sampling intervals further comprises:
 filtering, via the controller, a plurality of data observations indicative of the plurality of operational variables of the first wind turbine and a plurality of environmental variables affecting the first wind turbine, wherein filtering the plurality of data observations precludes an inclusion of data observations having a deviation greater than a standard deviation limit.

10. The method of claim 2, wherein assembling the first training data set at the plurality of sampling intervals further comprises:
 filtering a power output observation corresponding to a power output for each wind turbine of the designated grouping so as to preclude an inclusion of at least one power output observation having a deviation greater than a standard deviation limit.

11. The method of claim 2, wherein determining the modeled performance parameter further comprises:
 following the training of the first regression model, determining, via the controller, a performance parameter prediction;
 determining, via the controller, a statistical uncertainty value for the performance parameter prediction; and
 implementing, via the controller, a Bayesian optimization of the first regression model based on the statistical uncertainty.

12. The method of claim 2, wherein forming the designated grouping further comprises:
 minimizing an average delta performance uncertainty between differing DOE states for a plurality of potential designated groupings via a Bayesian optimization;
 determining a maximal quantity of wind turbines of the designated grouping corresponding to the minimized delta performance uncertainty; and
 determining a minimal quantity of wind turbines of the designated grouping corresponding to the minimized delta performance uncertainty.

13. The method of claim 1, wherein implementing the second model further comprises:
 assembling a second training data set comprising a plurality of operational and environmental variables and the performance parameter differential for the first wind turbine, the plurality of operational and environmental variables corresponding at least to the designated grouping of wind turbines monitored at the plurality of sampling intervals and DOE states and the first wind turbine;
 generating, via the controller, a second regression model configured to determine the predicted performance parameter for the first wind turbine based on the operational and environmental variables and the performance parameter differential; and
 training, via the controller, the second regression model based on the second training data set.

14. The method of claim 13, wherein assembling the second training data set further comprises:
 determining, via the controller, a turbulence intensity for each wind turbine of the designated grouping and the first wind turbine at each of the plurality of sampling intervals based, at least in part, on an estimated wind speed as modeled or a measured wind speed.

15. The method of claim 13, wherein assembling the second training data set further comprises:
- receiving, via the controller, data indicative of an atmospheric temperature affecting the first wind turbine at each of the plurality of sampling intervals;
- determining, via the controller, a rolling average temperature for the first wind turbine; and
- determining, via the controller, a temperature deviation for the first wind turbine at each of the plurality of sampling intervals corresponding to a difference between the data indicative of the atmospheric temperature and the rolling average temperature at each of the plurality of sampling intervals.

16. The method of claim 13, wherein assembling the second training data set further comprises:
- determining, via the controller, at least one low-authority region of operation of the first wind turbine, the at least one low-authority region corresponding to a range of operating conditions within which a desired command setpoint is limited based on an operational limit of the first wind turbine and is desynchronized from an optimal rotor speed or pitch setting; and
- applying, via the controller, a weighting factor to the performance parameter differential when the operational and environmental variables correspond to the at least one low-authority region, the weighting factor being configured to reduce an impact of the performance parameter differential on the predicted performance parameter.

17. The method of claim 13, wherein training the second regression model further comprises:
- separating a portion of the second training data set into a training portion having a first plurality of sampling intervals and a testing portion having a second plurality of sampling intervals, wherein the training portion comprises a greater quantity of sampling intervals relative to the testing portion;
- training the second regression model via the training portion;
- testing the second regression model via the testing portion;
- reforming the training portion and the testing portion by redistributing the first and second pluralities of sampling intervals of the portion of the second training data set; and
- repeating the training and testing of the second regression model, wherein repeating the training and testing of the second regression model facilitates a cross-validation test of the second regression model.

18. The method of claim 17, further comprising:
- implementing, via the controller, a Bayesian optimization to maximize the predicted performance parameter for the cross-validation test.

19. The method of claim 1, wherein the plurality of setpoint combinations comprise a plurality of tested setpoint combinations corresponding to a plurality of DOE states, and wherein determining the predicted performance parameter of the first wind turbine at each of the plurality of setpoint combinations further comprises:
- determining a predicted power output for each of the tested setpoint combinations; and
- selecting a setpoint combination of the tested setpoint combinations which maximizes the predicted power output of the first wind turbine.

20. The method of claim 19, wherein the plurality of tested setpoint combinations comprise a plurality of pitch setpoints and a plurality of tip speed ratio (TSR) setpoints, and wherein the selected setpoint combination comprises a pitch setpoint and a TSR setpoint which maximizes the predicted power output of the first wind turbine.

* * * * *